United States Patent [19]
Ito

[11] Patent Number: 6,067,588
[45] Date of Patent: May 23, 2000

[54] CHANNEL INTERFACE SIGNAL TRACING INPUT/OUTPUT CONTROLLER APPARATUS

[75] Inventor: Keiichi Ito, Saitama, Japan

[73] Assignee: Fuji Xerox Co., Ltd., Tokyo, Japan

[21] Appl. No.: 09/007,777

[22] Filed: Jan. 16, 1998

[30] Foreign Application Priority Data

Jan. 20, 1997 [JP] Japan ................................ 9-008062

[51] Int. Cl.[7] ............................................. G06F 13/28
[52] U.S. Cl. ........................ 710/28; 712/227; 714/48; 714/57; 714/43; 714/56; 714/38; 714/34; 714/35
[58] Field of Search ............................ 710/28; 711/106; 714/25, 48, 57, 43, 56, 38, 34, 35, 39, 45; 712/23, 227

[56] References Cited

U.S. PATENT DOCUMENTS

| | | | |
|---|---|---|---|
| 5,070,448 | 12/1991 | Crandall | 395/575 |
| 5,315,500 | 5/1994 | Uchishiba et al. | 364/183 |
| 5,537,607 | 7/1996 | Ploger, III | 395/830 |
| 5,751,942 | 5/1998 | Christensen et al. | 395/183.14 |
| 5,752,013 | 5/1998 | Christensen et al. | 395/568 |
| 5,758,065 | 5/1998 | Reams et al. | 395/185.01 |
| 5,897,653 | 4/1999 | Tashima | 711/106 |

FOREIGN PATENT DOCUMENTS 6-89240  3/1994  Japan .

*Primary Examiner*—Ayaz R. Sheikh
*Assistant Examiner*—Rupal D. Dharia
*Attorney, Agent, or Firm*—Finnegan, Henderson, Farabow, Garrett & Dunner, L.L.P.

[57] ABSTRACT

An input/output controller apparatus has a CPU arranged for directing an FPGA to generate a desired trace logic circuit and a channel controller to start communication with a host system. The channel controller while performing the communication with the host system delivers a channel sequence number via a buffer to the FPGA. In response, the FPGA saves the channel interface signal and the channel sequence number at given timing. When an error occurs during the communication, the CPU identifies the cause of the error by reviewing the channel interface signal and the channel sequence number saved in the FPGA. If the cause of the error fails to be identified, the FPGA is directed to generate another trace logic circuit suited for identifying the cause of the error. Accordingly, the size of a data storage used for tracing will be minimized and the overall area for installation of the apparatus will be minimized comparatively as well as the duration required for examining the communication between the host system and its peripherals will be reduced considerably. The apparatus may be linked to a plurality of host systems for equal advantages.

18 Claims, 24 Drawing Sheets

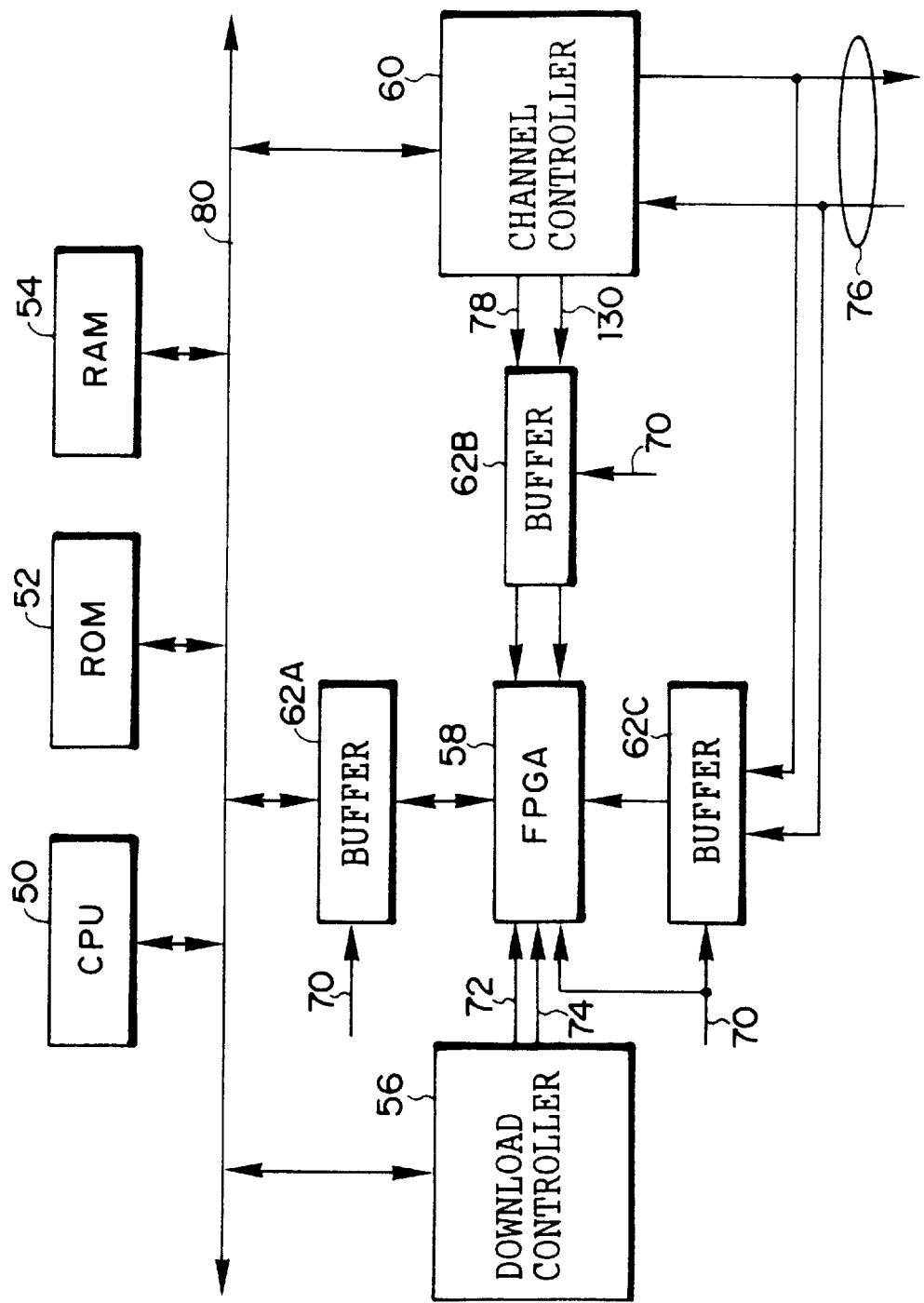
F I G. 2

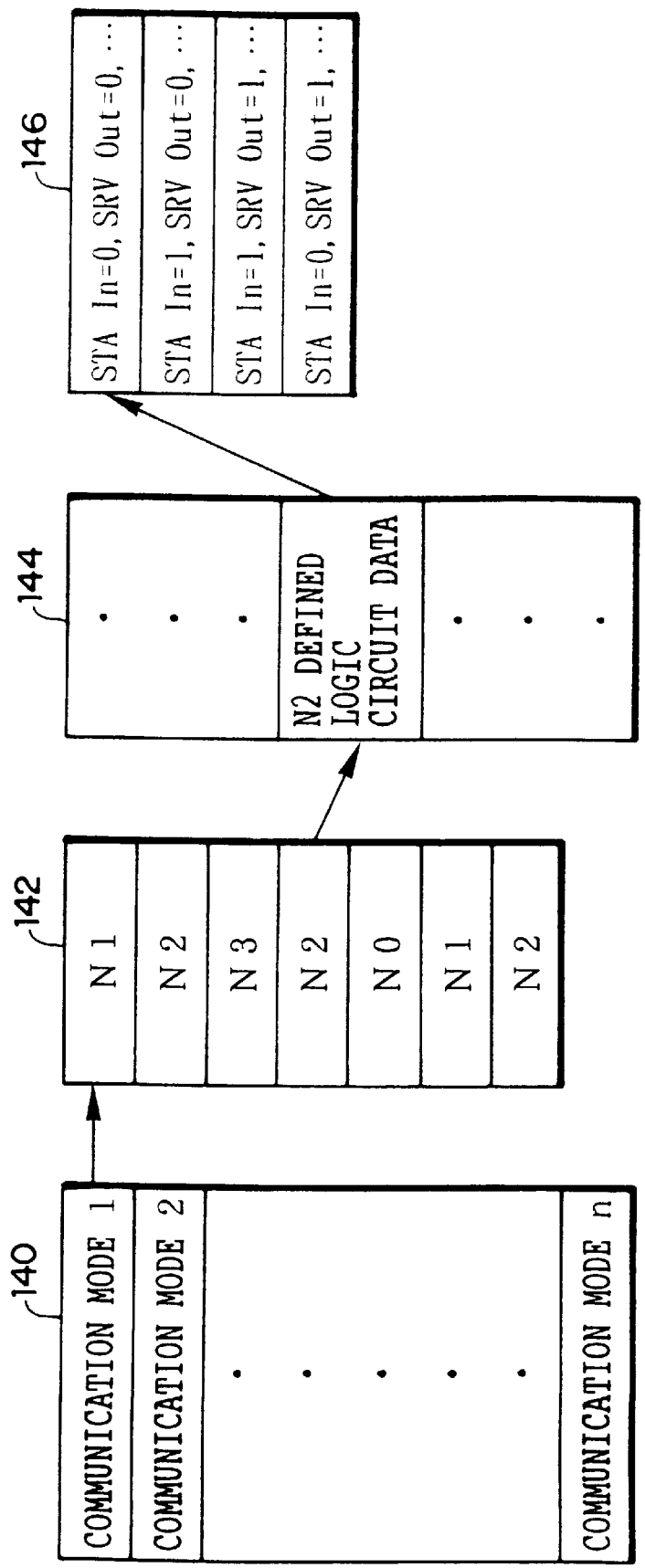
F I G. 9

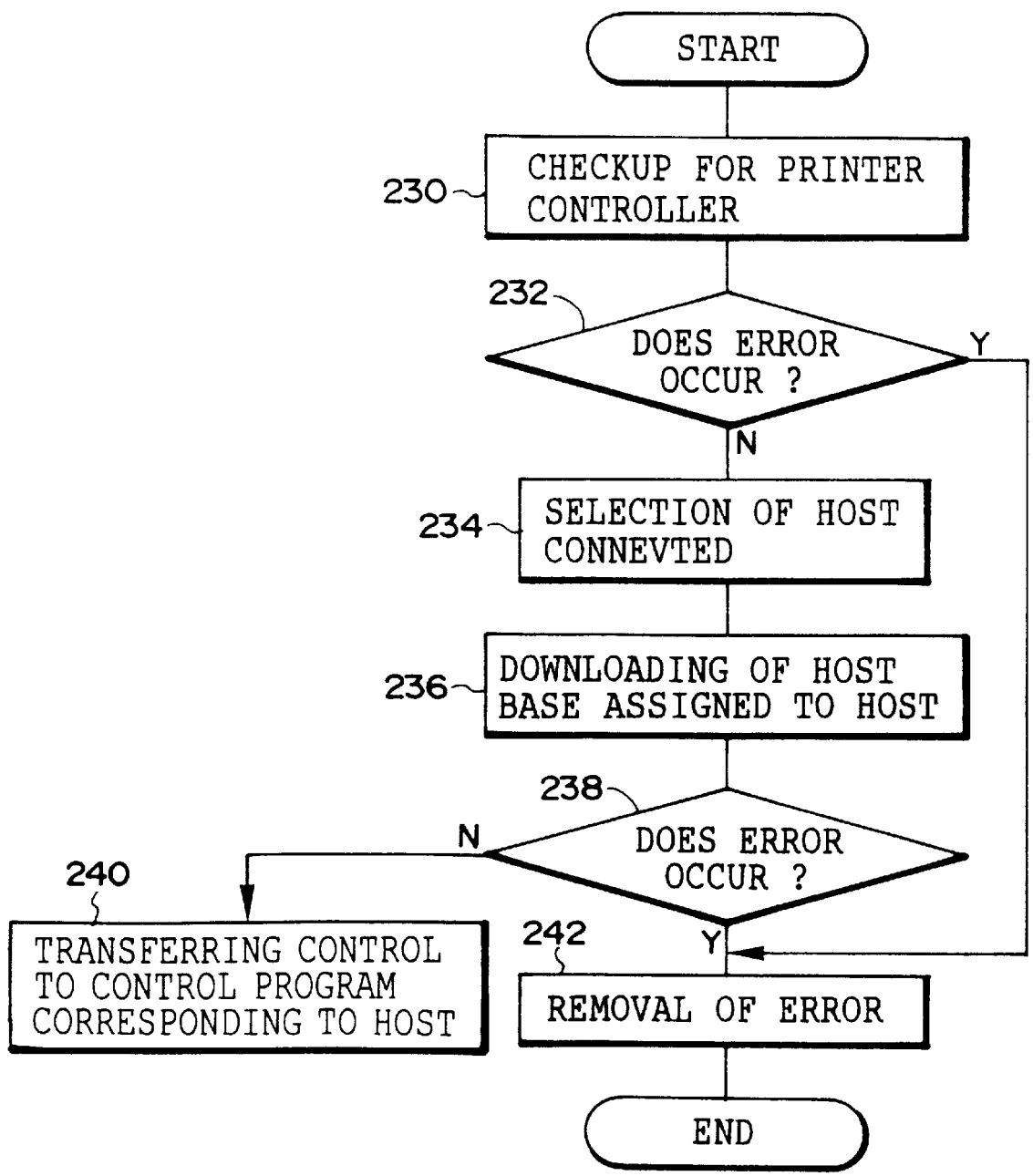
F I G. 1 8

CHANNEL INTERFACE SIGNAL TRACING INPUT/OUTPUT CONTROLLER APPARATUS

BACKGROUND OF THE INVENTION

1. Field of the Invention

The present invention relates to an input/output controller apparatus and particularly, to an input/output controller apparatus connected between channels of a host system and peripherals, for tracing channel interface signals.

2. Description of the Related Art

Such an input/output controller apparatus is known which is connected between channels of a host system and peripherals including a printer and a CRT display for controlling a sequence of input and output actions between the same.

For evaluating of, or for examining an unwanted event in, a system including the known input/output controller apparatus, the apparatus traces channel interface signals transmitted from the host system via the channels to the apparatus and from the apparatus via the channels to the host system.

FIG. 20 is a schematic system diagram showing an arrangement of the known input/output controller apparatus for tracing the channel interface signals. As shown, the known input/output controller apparatus comprises a ROM 52 for storing control programs or the like, a RAM 54 used as a work area for performing the control programs, a trace controller 55 for collecting and saving trace information in the tracing, a channel controller 60 for controlling a sequence of input and output actions of the channel interface signals, and a CPU 50 for controlling the overall operation of the input/output controller apparatus which all are connected to one another by a CPU bus 80.

The channel controller 60 is connected by a host channel cable 38 to the channels of the host system (not shown) for transmitting to and receiving from the channel of the host system channel controller 60 the channel interface signals. The host channel cable 38 branches to be connected to the trace controller 55. This allows the trace controller 55 to intercept the channel interface signals which are transmitted between the channels of the host system and the channel controller 60.

FIGS. 21 and 22 are block diagrams showing examples of conventional trace logic circuits for implementing the trace controller 55. The trace logic circuit shown in FIG. 21 is designed for sampling the channel interface signal at intervals of a given time. The trace logic circuit shown in FIG. 22 samples the channel interface signal at its points of change.

The trace logic circuit shown in FIG. 21 comprises a counter 100 for producing a storage address for the channel interface signal 76 in synchronization with a clock signal 122, a RAM 102 for storing the channel interface signal 76, a selector 114 responsive to a switching signal 132 for selectively connecting the RAM 102 to either a register 104 or the CPU bus 80, and the register 104 for synchronizing the channel interface signal 76 with a clock signal 122 to output the signal 76.

The counter 100 is connected between the CPU bus 80 and the RAM 102 which in turn is connected to the selector 114. The selector 114 is connected to the CPU bus 80 and the register 104. The input of the register 104 is further connected to a channel of the host system (not shown) for receiving the channel interface signal 76.

The tracing action in the known input/output controller apparatus shown in FIGS. 20 and 21 will now be explained in brief. It is assumed that the counter 100 and the RAM 102 are cleared at the beginning.

Upon receiving a command of starting the communication from an upper device (not shown), the CPU 50 retrieves a corresponding control program from the ROM 52 and actuates the channel controller 60 to start the communication with the channel of the host system as well as actuates the trace logic circuit in the trace controller 55. When having supplied the selector 114 with a switching signal 132 for directing the selector 114 to connect the RAM 102 to the register 104, the CPU 50 allows the counter 100 and the register 104 to receive a predetermined clock signal 122 format.

The counter 100 counts up in synchronization with the clock signal 122 from the CPU 50, delivering its count as an address signal to an address bus 120 in a sequential manner. The address signal on the address bus 120 is transferred to the RAM 102 for defining a storage location of received data.

The register 104 is also responsive to the same clock signal 122 which is supplied from the CPU 50 to the counter 100 and, is synchronized with the clock signal 122, in other words, is synchronized with the counting up of the counter 100 to transmit the channel interface signal 76.

The above procedure allows the channel interface signal 76 from the register 104 to be sequentially stored in the RAM 102 in response to the address signal from the counter 100.

As for specific length (period of time) the channel interface signals 76 have been stored, the CPU 50 supplies a predetermined switching signal 132 to the selector 114 for connecting the RAM 102 to the CPU bus 80 and then, retrieves the channel interface signal 76 from the RAM 102 via the selector 114 and the CPU bus 80 before transmitting it to the upper device (not shown). The channel interface signal 76 is received and edited by the upper device for outputting data on the display or the printer (not shown).

FIG. 23 is a timing chart showing fourteen kinds of the channel interface signals (ADR Out, SEL Out, . . . , DAT In) for communications with the known input/output controller apparatus illustrated in FIGS. 20 and 21. The timing chart includes a series of sampling points, shown at bottom, for the channel interface signal 76 in the trace controller 55. As apparent, the sampling timing in the trace controller 55 are aligned at equal intervals of a time synchronized with the clock signal 122.

The trace logic circuit shown in FIG. 22 is explained. As shown in FIG. 22, the trace logic circuit comprises a counter 100, a RAM 102, a selector 114, a couple of registers 104 and 106, a comparator 108, and an AND gate 112.

The register 104 is provided for synchronizing the channel interface signal 76 while the register 106 is for delaying the channel interface signal by one clock unit before comparison.

The comparator 108 compares data from the resistor 104 and data from the resistor 106. Its output signal 128 is low when the two data are identical and high when not.

The AND gate 112 is provided for receiving the output signal 128 of the comparator 108 and the clock signal 122. It is turned on when the output signal 128 of the comparator 108 only is high, transmitting the clock signal 122 to one clock input of the counter 100. More specifically, only when the two data from the resistors 104 and 106 are not identical to each other, the counter 100 is synchronized with and activated by the clock signal 122 for counting up.

The other components than the comparator 108, the resistor 106, and the AND gate 112 are identical to those of the prescribed trace logic circuit shown in FIG. 21 and will be explained in no more detail.

The tracing in the input/output controller apparatus shown in FIGS. 20 and 22 is explained in brief. It is also assumed that the counter 100 and the RAM 102 are cleared at the beginning.

Upon receiving a command for starting the communication from an upper device (not shown), the CPU 50 retrieves a corresponding control program from the ROM 52 and actuates the channel controller 60 to connect with the channels of the host system as well as the trace logic circuit in the trace controller 55. The CPU 50 supplies the selector 114 with the switching signal 132 for connecting the RAM 102 to the resistor 106 and then, delivers the clock signal 122 to the other input of the AND gate 112 and the clock inputs of both the resisters 104 and 106.

The register 104 transmits the channel interface signal 76 in synchronization with the clock signal 122 and the resister 106 transmits the channel interface signal 76 input from the register 104 in synchronization with the clock signal 122. More particularly, the register 106 constantly releases a form of the channel interface signal which precedes the channel interface signal received from the register 104 by one clock unit.

The comparator 108 compares the channel interface signal output of the register 104 and the channel interface signal output of the register 106 and delivers its result of comparison as the output signal 128 to the AND gate 112.

When the two channel interface signal outputs of both the registers 104 and 106 are identical to each other, the output signal 128 of the comparator 108 is low thus disabling the AND gate 112 and not allowing the counting up in the counter 100. If the two outputs are different, that is, the channel interface signal has a change, the output signal 128 of the comparator 108 is turned to high, hence turning on the AND gate 112 and allowing the counter 100 to count up.

In this manner, the address signal to be supplied to the RAM 102 is counted up by the counter 100 and used for storing data in the corresponding location in the RAM 102. More specifically, each updating of the address signal with the counter 100 permits the channel interface signal output 76 of the register 106 to be saved in the RAM 102.

Upon having a change, the channel interface signal 76 from the register 106 is stored in the address of the RAM 102 which is defined by the address signal of the counter 100 at every changing the channel interface signal.

When a predetermined length of the channel interface signal 76 has been stored, the CPU 50 supplies the selector 114 with another mode of the switching signal 132 for connecting the RAM 102 to the CPU bus 80 and then, retrieves the channel interface signal 76 stored in the RAM 102 via the selector 114 and the CPU bus 80 before sending it to the upper device not shown. The channel interface signal 76 is received and edited by the upper device for outputting on the display or the printer not shown.

FIG. 24 is a timing chart showing fourteen kinds of the channel interface signals (ADR Out, SEL Out, . . . , DAT In) for communications with the known input/output controller apparatus illustrated in FIGS. 20 and 22. The timing chart includes a series of sampling points, shown at bottom, for the channel interface signal 76 in the trace controller 55. As apparent, the sampling timing in the trace controller 55 are timed with the changes in the channel interface signal 76.

In a technique disclosed in Japanese Patent Application Laid-open (JP-A) No. 6-89240, a tracing action is made with at least one of the two trace logic circuits shown in FIGS. 21 and 22 installed in a peripheral device.

The technique disclosed in Japanese Patent Application Laid-open (JP-A) No. 6-89240 may however fail to detect a change in the channel interface signal which is shorter in time than the sampling period if the sampling period is long. If the sampling period is too short, the total of data stored in the memory will be increased thus requiring a large size of the storing capacity.

Should the two trace logic circuits shown in FIGS. 21 and 22 be provided together for switching from one to the other depending on the tracing action, they need a considerable size of the installation area in a package.

Since the analyzation of such a state as an unwanted event is carried out with the use of the information of sampled in the above manner, i.e., only the channel interface signal, it will hardly be decreased in the consumption of time and increased in the accuracy.

In addition, the foregoing trace logic circuits are assigned to specific host systems respectively and when another host system of which a command and a sequence of input and output actions may be different is used, they have to be replaced with a corresponding trace logic circuit.

SUMMARY OF THE INVENTION

It is an object of the present invention, for elimination of the above drawbacks, to provide an improved input/output controller apparatus of which the size of a memory required for tracing and the area of installation are decreased and the duration of time for examining the communication state between a host system and its peripherals is minimized, and which is applicable to a plurality of host systems.

As a first aspect of the present invention for achieving the object, an input/output controller apparatus connected between the channels of a host system and peripherals for tracing channel interface signals is provided comprising: a storage means for storing a plurality of logic circuit data, each logic circuit data producing a trace logic circuit of a proper type for collecting tracing data to identify an intrinsic fault; a download controlling means responsive to an input of the type of a trace logic circuit for downloading the logic circuit data of the logic circuit of the type from the storage means; a field programmable gate array responsive to downloading the logic circuit data from the storage means for generating a trace logic circuit corresponding to the logic circuit data; a channel controlling means for controlling a sequence of input and output actions over the channels and producing an internal signal indicative of controlling the sequence of input and output actions; and a controlling means for delivering a type of the trace logic circuit to the download controlling means and, when a fault occurs during the tracing, reading the tracing data collected by the trace logic circuit and the internal signal produced by the channel controlling means to identify the cause of the fault and, when the cause of the fault is not identified, delivering another type of the trace logic circuit, which is to be downloaded successively, to the download controlling means, and reading the tracing data collected by a newly generated trace logic circuit and the internal signal produced by the channel controlling means to identify the cause of the fault.

The input/output controller apparatus of the first aspect of the present invention allows the logic circuit data defined by a type of the trace logic circuit from the controller means to be downloaded from the storage means to the field programmable gate array by the download controlling means and used for generating the type of the trace logic circuit.

When the fault such as a communication error occurs during the tracing action, the controlling means analyzes the tracing data collected by the trace logic circuit and the internal signal produced by the channel controlling means to identify the cause of the fault. If the cause of the fault fails to be identified, another type of the trace logic circuit to be downloaded successively is instructed to the download controlling means and used for generating the another type of the trace logic circuit. The cause of the fault is then identified by analyzing the tracing data collected by the another type of the trace logic circuit and the internal signal from the channel controlling means. If the cause of the fault is not yet identified by generated the another type of the trace logic circuit, a further type of the trace logic circuit is generated. The action of identifying the cause of the fault can be repeated in this manner.

Since the field programmable gate array permits the action of identifying the cause of the fault to be repeated for generating different types of the trace logic circuit, the overall area for installation of the apparatus will be minimized as compared with provision of a plurality of trace logic circuits.

Also, for identifying the cause of the fault, the internal signal released sequentially from the channel controlling means is used in addition to the tracing data. This contributes to the reduction of a time required for identifying the cause of the fault.

Moreover, in case that the cause of the fault fails to be identified, another type of the trace logic circuit is generated and used for analyzing the tracing data and the internal signal. Accordingly, the identification of the cause of the fault will be performed automatically and with less consumption of energy.

As a second aspect of the present invention, the input/output controller apparatus of the first embodiment is modified in which the controlling means, when the cause of the fault is not identified, specifies a particular region which may include a location where the fault occurs from the tracing data collected by the type of the trace logic circuit and selects another type of the trace logic circuit which is capable of precisely collecting the tracing data from the trace logic circuit in the region and which is to be downloaded successively.

The input/output controller apparatus of the second embodiment allows the controlling means to, when the cause of the fault fails to be identified as has been examined in the first embodiment, specify the particular region, which may include a location where the fault occurs, from the tracing data collected by the type of the trace logic circuit and then, determine another type of the trace logic circuit which is to be downloaded successively and capable of collecting the tracing data in the region at higher precision than that of the type of the trace logic circuit.

More particularly, the tracing data is roughly sampled to specify the particular region including a location where the fault occurs and then, the region of the tracing data is precisely sampled. This considerably reduces the size of storage for the tracing data as compared with the precise sampling from the beginning of a conventional manner.

As a third aspect of the present invention, the input/output controller apparatus of the first or second embodiment is modified in which the controlling means identifies the cause of the fault by examining whether or not the collected tracing data coincides with a reference data at a normal operation.

The input/output controller apparatus of the third embodiment permits the cause of the fault to be identified in the input/output controller apparatus of the first or the second embodiment by examining whether or not the tracing data collected by the trace logic circuit coincides with the reference data at the normal operation. The comparison between the tracing data and its reference data for identifying the cause of the fault is relatively simple thus minimizing the overall length of time for examination.

As a fourth aspect of the present invention, the input/output controller apparatus of any of the first to third embodiments is modified by further comprising a second download controlling means for downloading a second logic circuit data, which is different from that stored in the storage means, from a memory in an upper level device and transmitting to a second storage means.

The input/output controller apparatus of the fourth embodiment includes the second download controlling means for downloading the second logic circuit data, which is different from that stored in the storage means, from the memory in the upper level device and transmitting to the second storage means, in addition to the arrangement depicted in any of the first to third embodiment.

Accordingly, if the cause of the fault fails to be identified with the use of the logic circuit data stored in the storage means, the different or second logic circuit data is downloaded from the memory in the upper level device and used for further identifying the cause of the fault.

As a fifth aspect of the present invention, the input/output controller apparatus of any of the first to fourth embodiments is modified by further comprising a transferring means for transferring the tracing data to the upper level device.

The input/output controller apparatus of the fifth embodiment, the input/output controller apparatus of any of the first to fourth embodiments, permits the tracing data collected with the trace logic circuit to be transferred by the transferring means to the upper level device.

Accordingly, the tracing data can be utilized by the upper level device and transmitted through the upper level device to its peripherals including a display and a printer. In case that the upper level device is provided with a function of communication with remote communications terminals, the tracing data can be accessed by a service worker operating the remote communications terminal.

BRIEF DESCRIPTION OF THE DRAWINGS

FIG. 2 is a schematic block diagram of a host I/F board provided in an embodiment of the present invention.

FIG. 9 is a schematic diagram showing a group of tables stored in the form of database in a ROM according to the embodiment.

FIG. 18 is a flowchart showing a control program performed by a processor board of the second embodiment of the present invention.

DESCRIPTION OF THE EMBODIMENTS

Embodiments of the present invention will be described in more detail referring to the accompanying drawings.

(First Embodiment)

Figure 1:
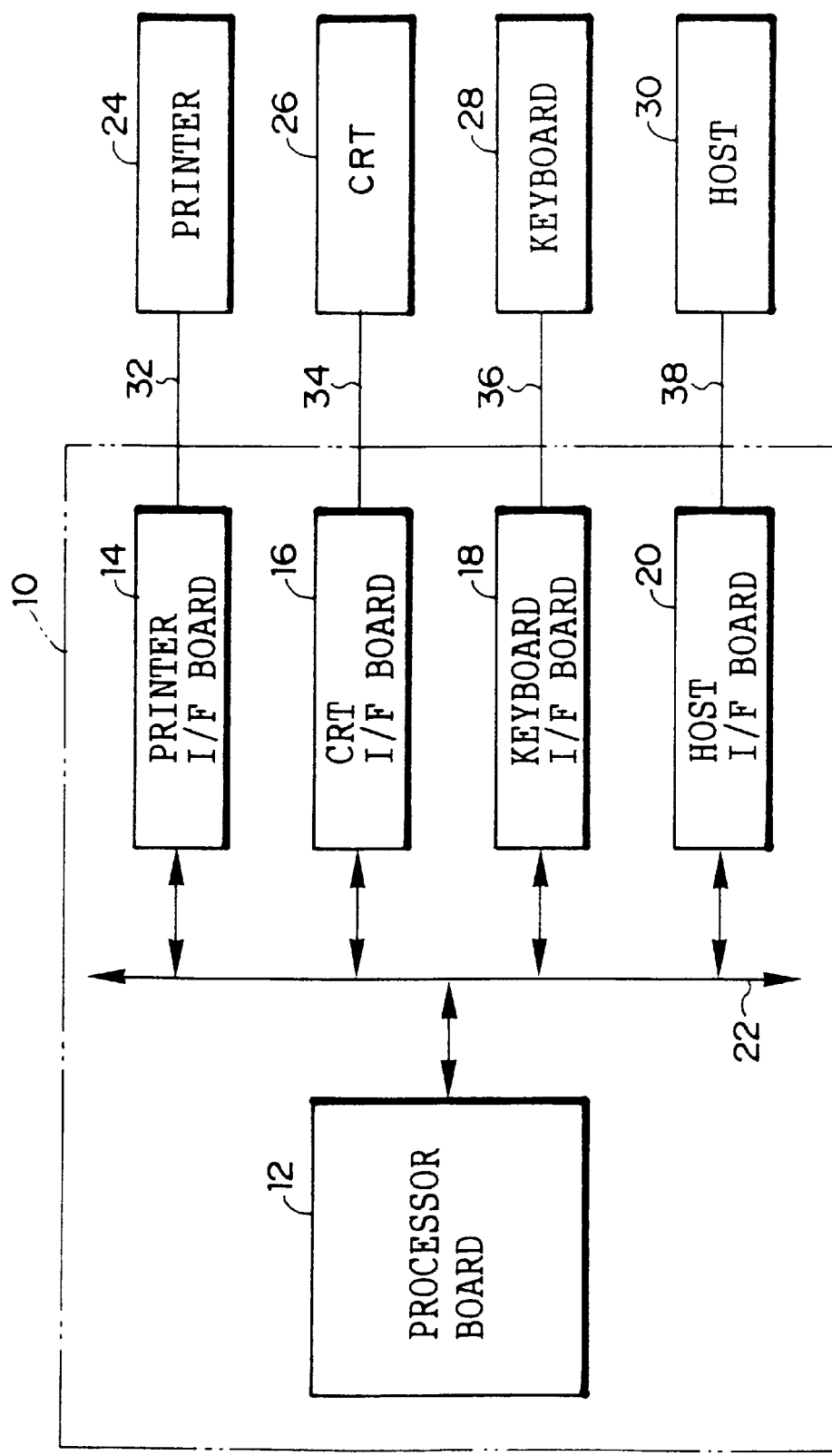
FIG. 1 is a block diagram of a system in which a typical work station including an input/output controller apparatus of the present invention is used as the platform for a printer.

FIG. 1 illustrates a system in which a general work station is used as the platform for a printer. As shown in FIG. 1, the system includes a controller 10 corresponding to the general work station, a printer 24, a CRT display 26, a keyboard 28, and a host system 30.

The controller 10 comprises a processor board 12 used as an upper device, a printer interface board 14 (referred to a printer I/F board hereinafter), a CRT interface board 16 (referred to as a CRT I/F board hereinafter), a keyboard interface board 18 (referred to as a keyboard I/F board hereinafter), and a host interface board 20 (referred to as a host I/F board hereinafter) used as the input/output controller apparatus. The boards are connected to each other by a system bus (SBUS) 22 of the general work station.

The printer 24 is connected by a printer connecting cable 32 to the printer I/F board 14. The CRT display 26 is connected by a CRT connecting cable 34 to the CRT I/F board 16. The keyboard 28 is connected by a keyboard connecting cable 36 to the keyboard I/F board 18. Channels, (not shown), of the host system 30 are connected by a host channel cable 38 to the host I/F board 20 for performing a predetermined sequence of input and output actions between the channels of the host system 30 and the host I/F board 20.

Figure 7:
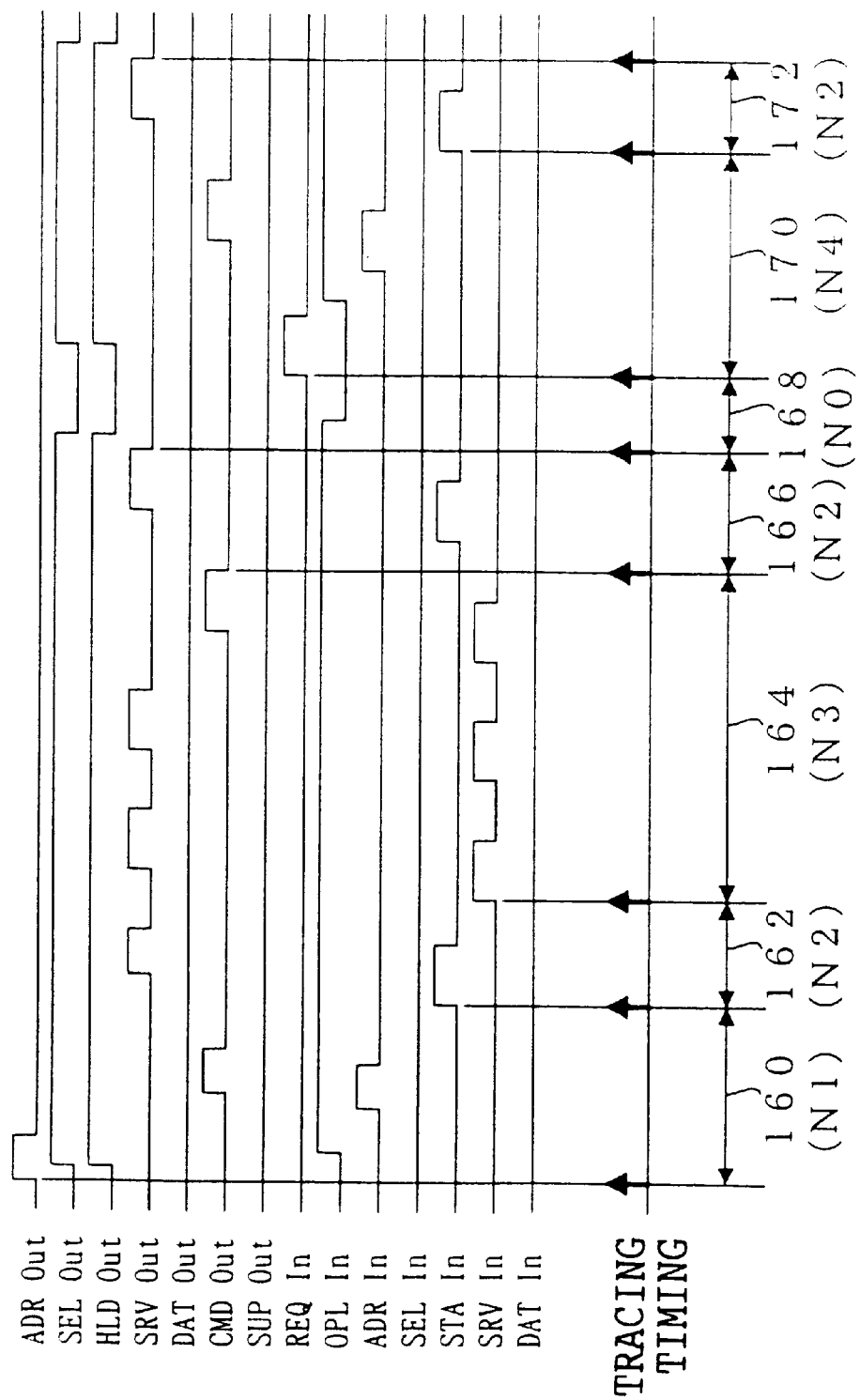
FIG. 7 is a timing chart showing channel interface signals at the normal operation timed by the trace logic circuit shown in FIG. 6 according to the embodiment.

FIG. 7 is a timing chart showing a sequence of input and output actions performed between the channel of the host system 30 and the host I/F board 20 for transferring printing data from the host system 30 to the printer 24. Illustrated are tag out modes of the channel interface signal (control signals transmitted from the channels of the host system 30 to the host I/F board 20) including, from top, ADR Out (address out) signal, SEL Out (selective out) signal, HLD Out (hold out) signal, SRV Out (service out) signal, DAT Out, (data out) signal, CMD Out (command out) signal, and SUP Out (suppress out) signal, and shown are tag in modes of the channel interface signal (control signals transmitted from the host I/F board 20 to the channels of the host system 30) including REQ In (request in) signal, OPL In (operational in) signal, ADR In (address in) signal, SEL In (selective in) signal, STA In (status in) signal, SRV In (service in) signal, and DATA In (data in) signal.

As apparent from FIG. 7, the timing chart consists of seven different sequences; a first sequence 160, a second sequence 162, a third sequence 164, a fourth sequence 166, a fifth sequence 168, a sixth sequence 170, and a seventh sequence 172.

The first sequence 160 is denoted by the sequence number N1, the second 162, the fourth 166, and the seventh sequence 172 by N2, the third sequence 164 by N3, the fifth sequence 168 by N0, and the sixth sequence 170 by N4. The second sequence 162, the fourth sequence 166, and the seventh sequence 172 denoted by the same number N2 are identical. Each sequence is also divided into segments which are numbered in a sequence (not shown).

The action of the sequences 160 to 172 is now explained.

In the first sequence 160, the address signal (in this embodiment, the address of the printer 24) for a peripheral to which data is transferred from the host system 30 and the command signal for transfer of the data are supplied to the host I/F board 20.

In the second sequence 162, a signal indicative of whether or not the host I/F board 20 is ready to receive the data from the host system 30 is delivered to the host system 30. In this embodiment, the signal indicates that it is ready for receiving the data.

In the third sequence 164, the data is transferred from the host system 30 to the host I/F board 20.

In the fourth sequence 166, a signal indicative of whether or not the host I/F board 20 has normally received the data transferred from the host system 30 during the third sequence 164 is given to the host system 30.

The fifth sequence 168 is provided as an (idling) period for use when a communication from the host system 30 to another peripheral or vice versa is requested. In this sequence 168, the main action for the channel data is hanged up.

In the sixth sequence 170, a command for connecting the host I/F board 20 to the channel of the host system 30 is released.

In the seventh sequence 172, a signal indicative of whether the data which has been transferred from the host system 30 in the third sequence 164 has been properly processed (e.g. transferred to the processor board 12) or not is delivered to the host system 30.

FIG. 2 illustrates a block diagram of the host I/F board 20 shown in FIG. 1. As shown, the host I/F board 20 comprises a CPU 50 as a controlling means, a ROM 52 and a RAM 54 as storing means, a download controller 56 as a download controlling means with the CPU, a field programmable gate array 58 (referred to as an FPGA hereinafter), a channel controller 60 as a channel controlling means with the CPU, and three buffers 62A to 62C in a try state. The FPGA is explicitly discussed in Japanese Patent Application Laid-open (JP-A) Nos. 5-3250, 7-160757, or 8-6809.

Stored in the ROM 52 are logic circuit data for generating a trace logic circuit, reference data or database of expected values for normal operation, and control programs which are performed by the CPU 50, etc. The RAM 54 is used as a work area on the like for performing a control program with the CPU 50.

The CPU 50, the ROM 52, the RAM 54, the download controller 56, the channel controller 60, and the buffer 62A are connected to each other by a CPU bus 80. The FPGA 58 is connected to each of the download controller 56 and the three buffers 62A to 62C. The buffer 62B is coupled to the channel controller 60 which in turn is connected by a host channel cable 38 to the channels of the host system 30 (See also FIG. 1) for input and output of the channel interface signal 76. The host channel cable 38 is divided into two at an intermediate, one being connected to the buffer 62C. This allows the buffer 62C to receive the channel interface signal 76.

The operation of the embodiment for transferring printing data from the host system 30 to the printer 24 shown in FIG. 7 will be described referring to a flowchart shown in FIG. 3. The flowchart of FIG. 3 incorporates a control program stored in the ROM 52 and used by the CPU 50 for transferring the data between the channel of the host system 30 and the channel controller 60.

The flowchart starts with Step 200 where, in the embodiment, the initial states of the printer 24, the CRT display 26, and the keyboard 28 are checked. It is examined at Step 202 from the result of checking at Step 200 whether or not there is any error. If an error is found, the procedure goes to Step 226 for eliminating the error before terminating the control program. When no error is found at Step 202, the procedure advances to Step 203.

Figure 4:
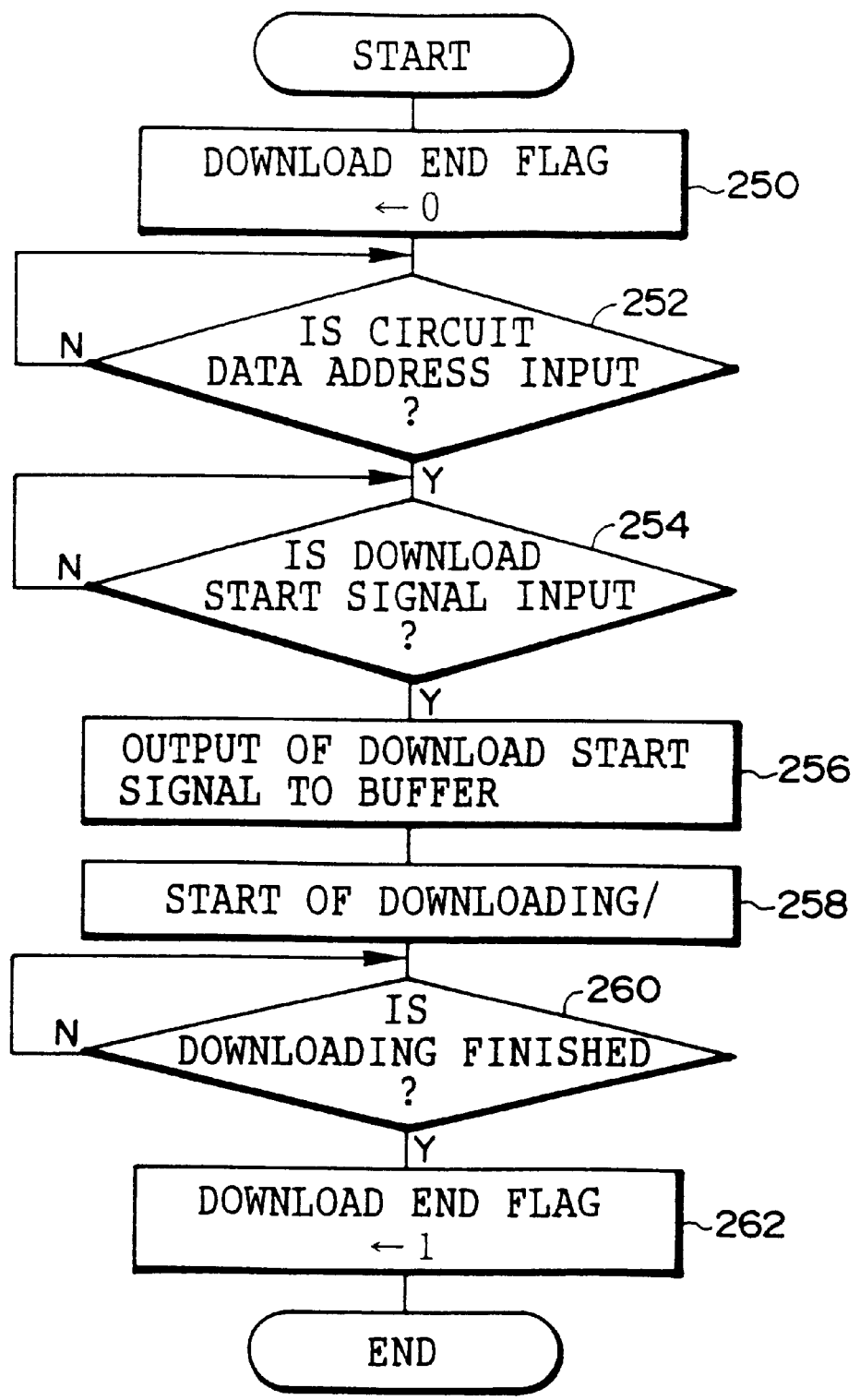
FIG. 4 is a flowchart of a download control program performed by a CPU of a download controller in the embodiment.
Figure 5:
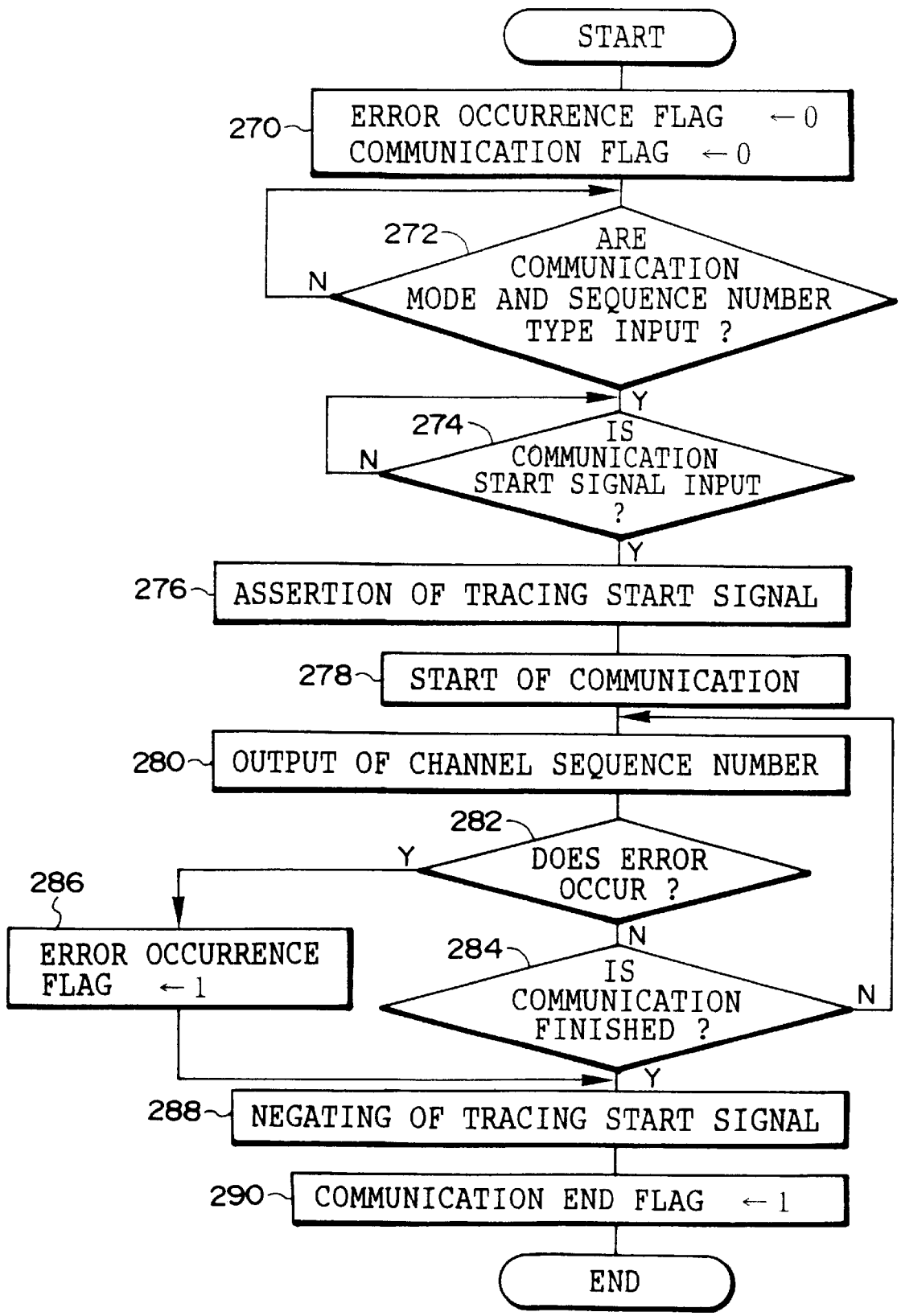
FIG. 5 is a flowchart of a channel control program performed by a CPU of a channel controller in the embodiment.

At Step 203, the download control program shown in a flowchart of FIG. 4 is started by a CPU, not shown, in the download controller 56 and simultaneously, the channel control program shown in a flowchart of FIG. 5 is commenced by a CPU, not shown, in the channel controller 60. The download control program is explained in more detail.

Referring to FIG. 4, a download flag of 0 is set at Step 250 indicating the end of the downloading.

This is followed by Step 252 for waiting for inputting a storage address of logic circuit data in the ROM 52 (the start and end locations of a storage area) for generating a trace logic circuit, which is downloaded from the CPU 50 as a type of the trace logic circuit. When the storage address has been received, the procedure moves to Step 254 for waiting for a download start signal which is supplied from the CPU 50 to command the start of downloading. As the download start signal has been received, the procedure goes to Step 256.

At Step 256, the download start signal denoted by 70 is delivered to each of the three buffers 62A to 62C. Accordingly, each of the buffers 62A to 62C are turned to a high impedance state hence isolating the FPGA 58 and the download controller 56 from the other components in the circuit. This prevents the other components than the download controller 56 from receiving unwanted signals from the FPGA 58 during the downloading of the logic circuit data to the FPGA 58 or the generation of the trace logic circuit.

At Step 258, the logic circuit data stored in the storage address of the ROM 52 inputted at Step 252 is downloaded to the FPGA 58. Then, Step 260 stands by for end of the downloading. When the downloading has been finished, the procedure goes to Step 262 for giving a download end flag of 1 before terminating the download control program.

The channel control program shown in the flowchart of FIG. 5 is explained in more detail.

The flowchart starts with Step 270 for setting to 0 an error occurrence flag indicative of occurrence of an error in the communication and a communication end flag indicative of end of the communication.

Step 272 stands by for receiving a communication mode and a channel sequence number from the CPU 50. When the communication mode and the channel sequence number have been received, the procedure goes to Step 274 for waiting for a communication start signal which commands the start of communication and is supplied from the CPU 50. When the communication start signal has been received, the procedure advances to Step 276.

At Step 276, a trace start signal for enabling the trace logic circuit to perform a tracing action is asserted. Then, Step 278 follows where the communication is started in the communication mode determined at Step 272.

After starting the communication, either an undefined (brief) sequence number or a defined sequence number is supplied as the internal signal indicative of a sequence currently under way to the buffer 62B at Step 280. The switching between the undefined and defined sequence numbers is controlled by a mode of the channel sequence number supplied from the CPU 50 at Step 272. In the embodiment, the first channel sequence number transmitted in the beginning from the CPU 50 to the channel controller is undefined and the second and higher channel sequence numbers are defined, which will be explained later in more detail. In the beginning of the channel control program, the undefined sequence number is supplied and thereafter, the defined sequence number is delivered.

It is then examined at Step 282 whether there is any error occurs or not. At the time, the unshown CPU in the channel controller 60 monitors each channel interface signal and examines whether or not an error signal such as a selective reset signal exists, which is generated when the host system 30 receives a different output of the host I/F board 20 from its expected one and will be explained later in more detail. When no error signal exists, the procedure goes to Step 284 where it is checked whether the communication is finished or not. If not, the procedure returns back to Step 280 and when so, it goes further to Step 288. If any error signal is found at Step 282, the procedure moves to Step 286 for setting the error occurrence flag to 1 before advancing to Step 288.

At Step 288, the trace start signal asserted at Step 276 is negated to terminate the tracing action with the trace logic circuit. Step 290 then follows for setting the communication end flag to 1 and the channel control program is ended.

Figure 3:
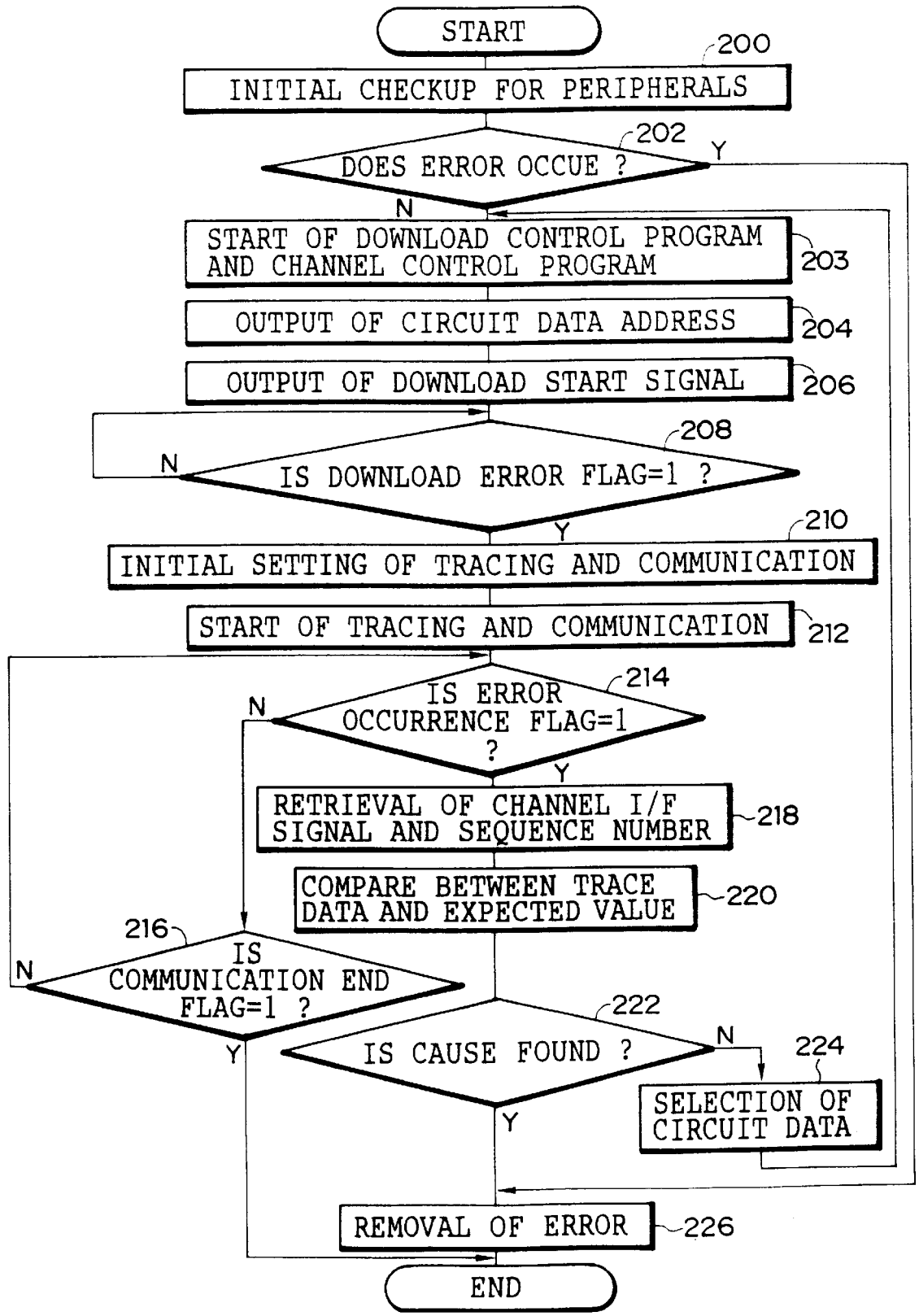
FIG. 3 is a flowchart of a control program performed by a CPU of the host I/F board in the embodiment.

As both the download controller 56 and the channel controller 60 start the download control program shown in FIG. 4 and the channel control program shown in FIG. 5 respectively, Step 204 in FIG. 3 for feeding the storage address of a desired logic circuit data in the ROM 52 to the download controller 56 is followed by Step 206 for supplying the download controller 56 with the download start signal.

At Step 208, the download end flag is monitored. When the download end flag is turned to 1, it is judged that the desired (predetermined) logic circuit data has been downloaded to the FPGA 58 and the procedure goes to Step 210.

Figure 6:
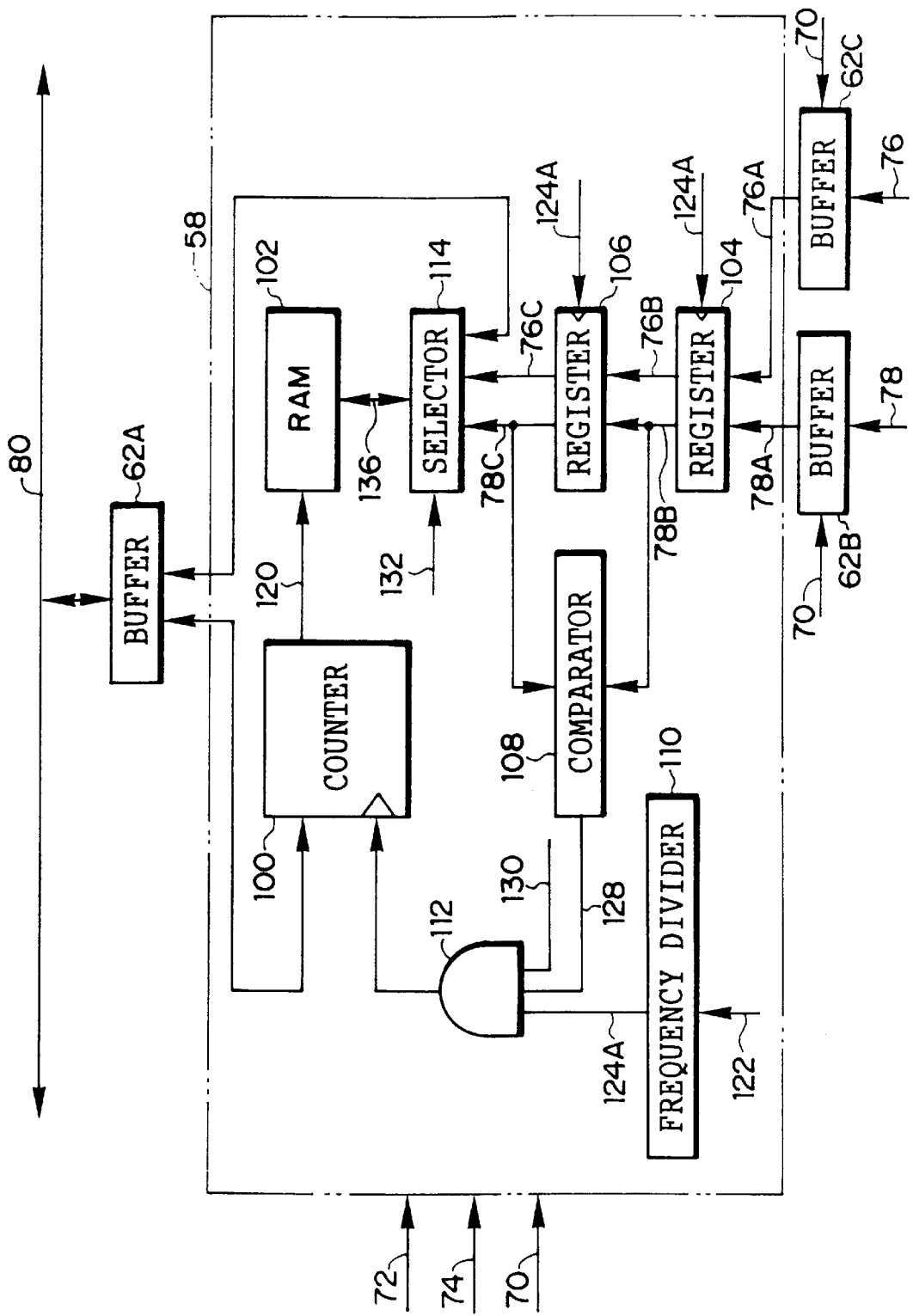
FIG. 6 is a block diagram of a trace logic circuit downloaded at the first from the FPGA of the embodiment and its peripherals connected.

FIG. 6 is a block diagram showing the trace logic circuit downloaded in the beginning to the FPGA 58 by the download controller 56 and its connection to peripherals.

As shown, the trace logic circuit downloaded to the FPGA 58 comprises a counter 100, a RAM 102, a selector 114, a couple of registers 104 and 106, a comparator 108, a frequency divider 110, and an AND gate 112.

The counter 100 is connected at input to the buffer 62A and at output by an address bus 120 to an (address) input of the RAM 102. The RAM 102 is also connected to the selector 114 by a data bus 136. A (switching signal) input of the selector 114 is connected (as not shown) to the buffer 62A for receiving from the CPU 50 a switching signal 132 which is used for switching the connection in the selector 114.

Two inputs of the register 104 are connected to an output of the buffer 62B and an output of the buffer 62C respectively. Two outputs of the register 104 are connected to two inputs of the register 106 of which outputs are connected to the selector 114.

One of the outputs of the register 104 for delivering a channel sequence number 78B is connected to one of two inputs of the comparator 108. Similarly, one of the two outputs of the register 106 for delivering a channel sequence number 78C is connected to the other input of the comparator 108. The output of the comparator 108 is connected to one input of the AND gate 112.

The frequency divider 110 is connected (as not shown) at input to the buffer 62A for receiving a clock signal 122 from the CPU 50.

The inputs of the AND gate 112 are connected to an output of the frequency divider 110 and (as not shown) an output of the buffer 62B for receiving a trace start signal 130 from the channel controller 60, as well as to the output of the comparator 108. An output of the AND gate 112 is connected to a (clock) input of the counter 100.

The frequency divider 110 is also connected (as not shown) at its output to (clock) inputs of the two registers 104 and 106.

The counter 100 determines the storage address in the RAM 102 for a channel sequence number 78C transmitted from the channel controller 60 via the buffer 62B to the RAM 102 and a channel interface signal 76C transmitted from either the host system 30 or the channel controller 60 via the buffer 62C to the RAM 102. The RAM 102 is a memory for storing the channel sequence number 78C and the channel interface signal 76C. The selector 114 selectively connects the RAM 102 to the register 106 or the buffer 62A.

The register 104, in synchronized with is responsive to the clock signal received at its clock input, saves a channel sequence number 78A from the buffer 62B and a channel interface signal 76A from the buffer 62C. The register 106 delays each signal saved in the register 104 by one clock unit for further comparison.

The comparator 108 compares two output data of the registers 104 and 106. When the two output data are identical, a low level signal is released from the comparator 108. When not identical, a high level signal is delivered. The output signal from the comparator 108 indicates a point of data change in the signal supplied to the registers 104 and 106 and will thus be referred to as a change signal 128 hereinafter.

The frequency divider 110 divides the clock signal 122 loaded via the buffer 62A from the CPU 50 to have a predetermined fraction of frequency.

The AND gate 112 is an AND gate logic receiving, as input signals, the change signal 128 from the comparator 108, a divider clock signal 124A produced from the clock signal 122 by the frequency divider 110, and the trace start signal 130 from the channel controller 60. When both the change signal 128 from the comparator 108 and the trace start signal 130 from the channel controller 60 are high, the AND gate 112 is turned on to pass the divider clock signal 124A to the clock input of the counter 100. More specifically, when the two output data of their respective registers 104 and 106 are not identical and the trace start signal 130 is high, the count in the counter 100 is counted up in synchronization with the divider clock signal 124A.

When the downloading with the trace logic circuit has been finished and it is judged yes at Step 208, the tracing action and the communication are initialized at Step 210. The initial setting for the tracing action includes clearing of the RAM 102 and resetting of the counter 100 (to the start address in the storage area of the RAM 102 for the channel sequence number 78C and the channel interface signal 76C) in the FPGA 58. The initial setting for the communication includes selection of the communication mode and the channel sequence number (either the undefined or defined sequence number) in the channel controller 60.

It should be noted that in this embodiment, the communication mode for transferring the printing data from the host system 30 to the printer 24 and the undefined channel sequence number are selected at the initial setting.

When the initial setting for the tracing action and the communication has been finished at Step 210, the FPGA 58 and the channel controller 60 are actuated at Step 212 for starting the tracing action and the communication. Simultaneously, the CPU 50 supplies the channel controller 60 with the communication start signal indicative of commanding the start of the communication and sends the switching signal 132 via the buffer 62A to the selector 114 of the trace logic circuit for connecting the RAM 102 to the register 106. The CPU 50 also delivers the clock signal 122 of a given period via the buffer 62A to the frequency divider 110.

The channel controller 60 upon receiving the communication start signal from the CPU 50 asserts the trace start signal 130 and starts the communication in a desired mode initialized at Step 210 and delivers an undefined sequence number initialized at Step 210 to the buffer 62B.

The frequency divider 110 of the trace logic circuit divides the clock signal 122 from the CPU 50 to have a divider clock signal 124A which is shorter in cycle than the clock signal 122 and delivers the divider clock signal 124A to the input of the AND gate 112 and to the clock inputs of the two registers 104 and 106.

The register 104 saves the channel sequence number 78A received from the buffer 62B and the channel interface signal 76A received from the buffer 62C in synchronization with the divider clock signal 124A. The register 106 saves the channel sequence number 78B and the channel interface signal 76B both received from the register 104 in synchronization with the divider clock signal 124A. Accordingly, the register 106 delivers the channel sequence number 78C and the channel interface signal 76C which precede by one clock unit the channel sequence number 78B and the channel interface signal 76B respectively received from the register 104.

The comparator 108 compares the channel sequence numbers 78B and 78C from their respective registers 104 and 106 and, when the two numbers are not identical, delivers a high signal. This permits the AND gate 112 to receive at its input the change signal 128 of high level when the channel sequence number is different and turn on for transmitting the divider clock signal 124A from the frequency divider 110 to the clock input of the counter 100.

Upon receiving the divider clock signal 124A from the AND gate 112, the counter 100 counts up its count which is then released as the address signal to the address bus 120. The address signal on the address bus 120 is transferred to the RAM 102 for defining the location of data storage.

The channel sequence number 78C and the channel interface signal 76C are released from the register 106 at the timing of the divider clock signal 124A and stored in the location in the RAM 102 defined by the address signal transmitted via the address bus 120 from the counter 100.

In that manner, the channel sequence number 78C and the channel interface signal 76C from the register 106 can be stored in the location in the RAM 102 defined by the address signal transmitted via the address bus 120 from the counter 100 upon each change of the channel sequence number. A timing of relevant tracing action is also shown at the bottom of the timing chart of FIG. 7.

When the tracing action and the communication have been started at Step 212, it is examined at Step 214 whether there is an error or not in the communication. For the purpose, the CPU 50 monitors the error occurrence flag which is shifted to 1 when an error occurs by the channel controller 60. If the flag is 0, it is judged that there is no error and the procedure goes to Step 216 where it is examined whether the communication is finished or not. Also, the CPU 50 monitors the communication end flag which is turned to 1 when the communication is finished by the channel controller 60. When the flag is 0, it is judged that the communication is under way and the procedure returns back to Step 214. When the flag is turned to 1, it is judged that the communication is finished and its control program is terminated. More specifically, a combination of no at Step 214 and yes at Step 216 means that the communication is finished and the control program is terminated.

When the error occurrence flag is 1, it is judged at Step 214 that an error occurs and the procedure goes to Step 218.

Figure 8:
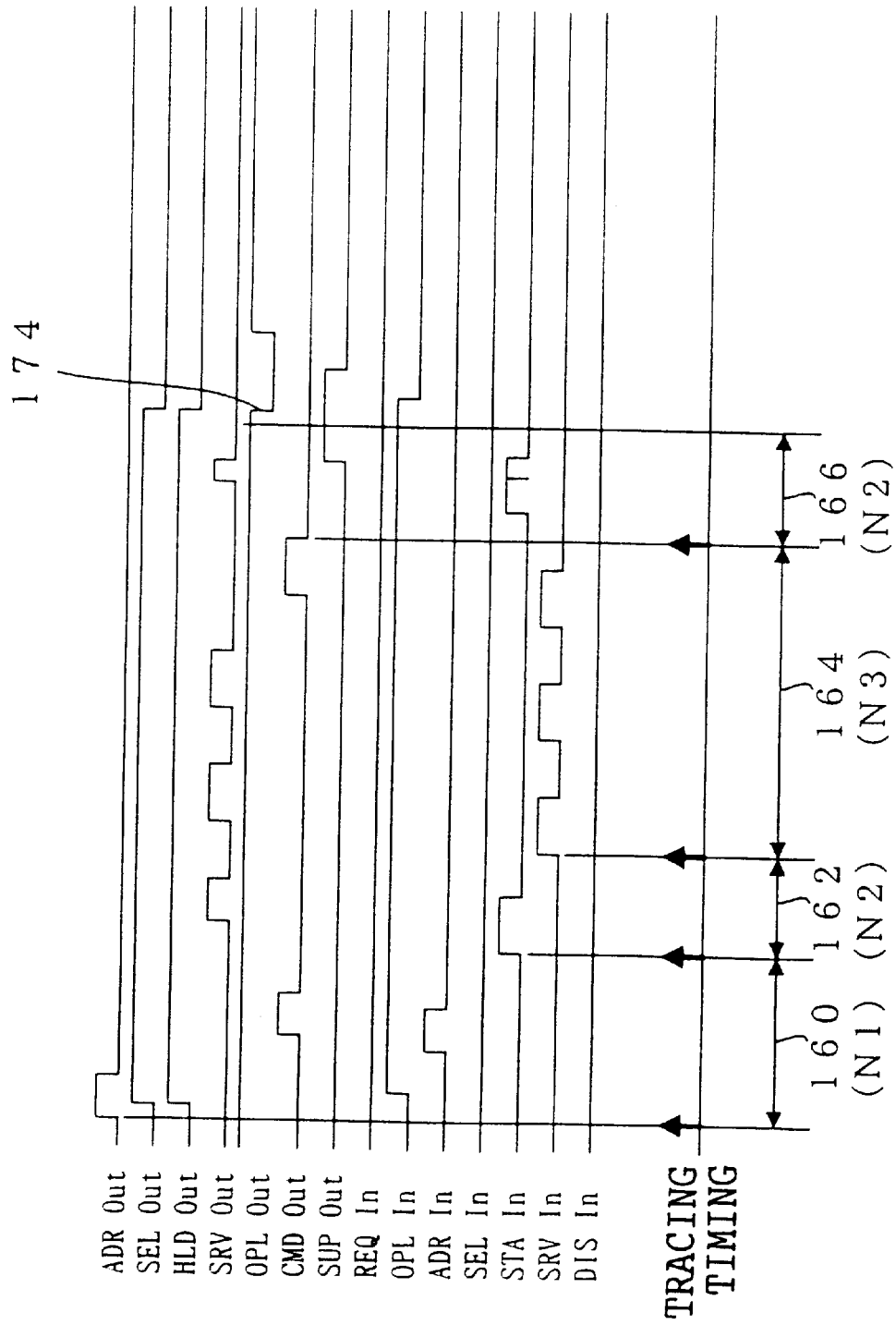
FIG. 8 is a timing chart showing the channel interface signals at an abnormal operation timed by the trace logic circuit shown in FIG. 6 according to the embodiment.

FIG. 8 illustrates an example of timing chart showing the channel interface signals when an error occurs during the communication. In the example, the STA In signal has a shoot at its high level in the fourth sequence 166. When detecting its shoot in the signal, the host system 30 shifts the SUP Out signal to high and then, the OPL Out signal to low before releasing the selective reset signal 174.

As the error signal such as the selective reset signal 174 has been released, the channel controller 60 turns the error occurrence flag to 1 causing the procedure to shift from Step 214 to Step 218 where the corresponding channel interface signal and sequence number are read from the RAM 102 of the trace logic circuit. Simultaneously, the CPU 50 delivers the switching signal 132 via the buffer 62A to the selector 114 thus allowing the RAM 102 to be connected to the buffer 62A for releasing the channel interface signal and the channel sequence number from its storage.

At Step 220, the channel interface signal read out at Step 218 is compared with the reference data or expected value (a value of the channel interface signal in the normal communication) which is stored for each channel sequence in the form of database in the ROM 52.

FIG. 9 shows a group of tables stored as the database in the ROM 52.

A communication mode table 140 has a plurality of areas which correspond to a number (denoted by n in this embodiment) of communication modes assigned to the host I/F board 20 and contain their corresponding start address numerals of an undefined sequence number table 142.

The undefined sequence number table 142 holds a time sequence of the expected values of the channel interface signal for the undefined sequence numbers of their respective communication modes. In other words, the undefined sequence number table 142 includes the expected values timed with the channel interface signal shown in the timing chart in the normal communication of FIG. 7.

In case that the data transfer is carried out in the communication mode 1, the CPU 50 refers the address stored in the first area of the communication mode table 140 to determine an address location in the undefined sequence number table 142 where the expected value of the channel interface signal for the corresponding undefined sequence number to the communication mode 1 and compares the channel interface signal received from the trace logic circuit with the expected value.

In this embodiment, the selective set signal 174 is released from the host system 30 in the fifth sequence 168 and the channel interface signal of each sequence sampled up to the trace timing at the start of the fourth sequence 166 is compared with the expected value.

It is then examined at Step 222 whether or not the cause of the error is identified from a result of the comparison at Step 220. When either the tagout or tagin signal is diverted from the expected value, it is judged that the cause of the error is identified and the procedure advances to Step 226. Otherwise, it is judged that the cause of the error is not identified and Step 224 follows. As shown in the trace timing of FIG. 8, both the tagout and tagin signals exhibit no discrepancy from the expected value and it is judged that the cause of the error is not identified. Then, the procedure moves to Step 224.

At Step 224, the succeeding trace logic circuit to be downloaded is selected. For the purpose, the CPU 50 selects a circuit which can precisely trace the sequence (the fourth sequence 166 in this embodiment) which is denoted by the undefined sequence number prior to the channel controller 60 detecting the selective reset signal 174 released from the host system 30.

A defined sequence number table 144 shown in FIG. 9 holds data of the trace logic circuits, each circuit precisely tracing the corresponding undefined sequence. The address data (of the start location and the end location) of the logic circuit data, which is assigned to the trace logic circuit capable of tracing its corresponding defined sequence, in the defined sequence number table 144 are stored in the undefined sequence number table 142 in addition to the expected value for the channel interface signal in each communication mode. At Step 224, by referring the storage area or fourth area allocated to the fourth sequence 166 in the undefined sequence number table 142, the address data in the defined sequence number table 144 is selected for obtaining the data of the trace logic circuit which can precisely trace the fourth sequence 166.

When the data for implementing the trace logic circuit, which is to be downloaded successively, has been obtained at Step 224, the procedure returns back to Step 203. This is followed by the second cycle of the prescribed procedure from Step 203 to Step 222 including downloading of the second trace logic circuit, reading the channel interface signal and the channel sequence number in case of an error occurs, and comparing the channel interface signal with its expected value. It is noted that the address of the logic circuit data at Step 204 is identical to that retrieved at Step 224. In the initial setting at Step 210, the channel controller 60 is set for delivering the defined sequence number.

Figure 10:
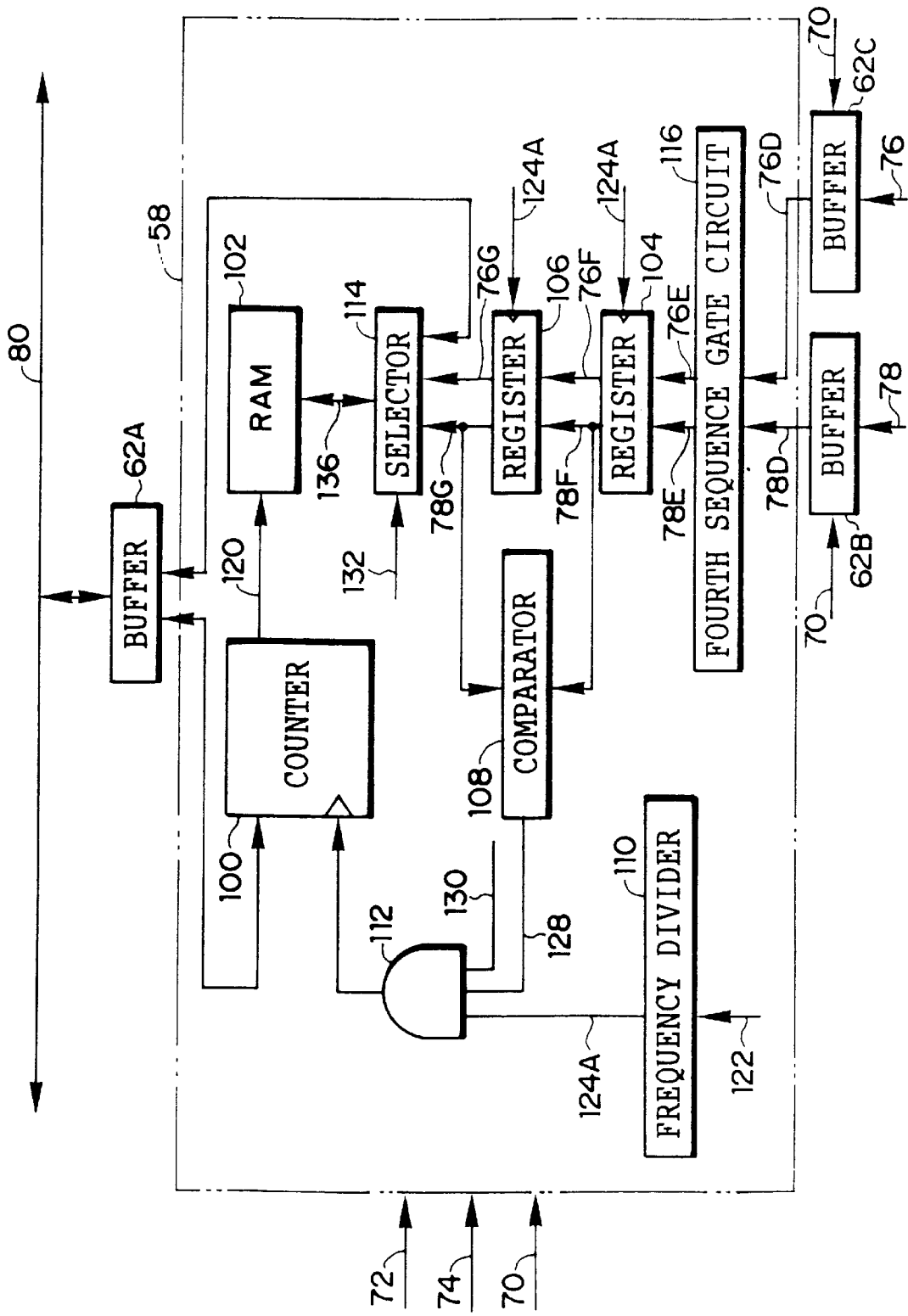
FIG. 10 is a block diagram of a trace logic circuit downloaded at the second from the FPGA of the embodiment and its peripherals connected.

FIG. 10 illustrates the second trace logic circuit downloaded to the FPGA 58 and its peripherals. As shown, the second trace logic circuit used for the second cycle of tracing action has an extra fourth sequence gate circuit 116 connected between the register 104 and the two buffers 62B and 62C of the first trace logic circuit (FIG. 6) used for the first cycle of the tracing action. The forth sequence gate circuit 116 is a gate for releasing a channel sequence number 78E and a channel interface signal 76E during only the fourth sequence 166. This allows the RAM 102 to receive and save a channel sequence number 78G and a channel interface signal 76G traced by the second tracing action in the fourth sequence 166.

Figure 11:
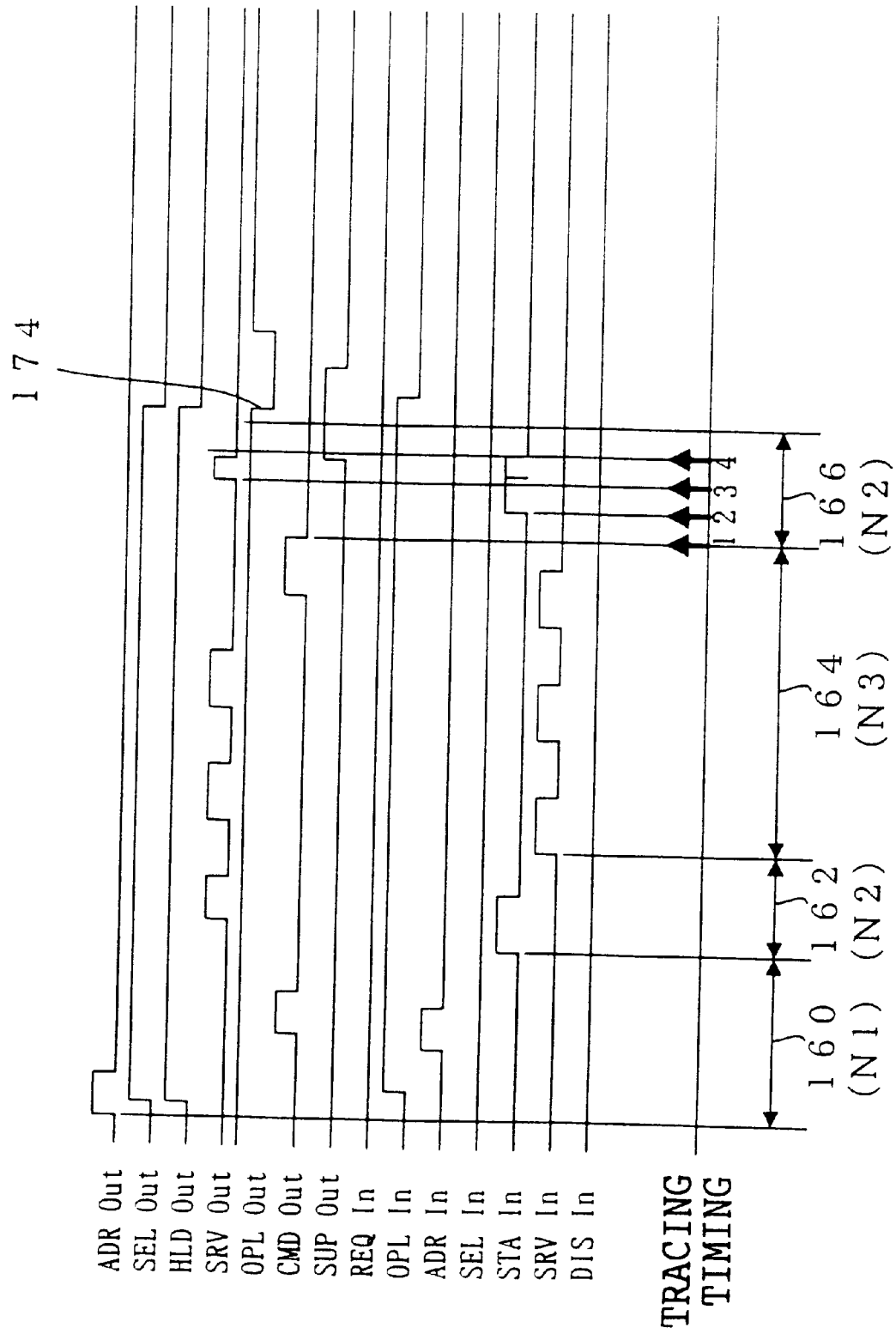
FIG. 11 is a timing chart showing the channel interface signals at an abnormal operation timed by the trace logic circuit shown in FIG. 10 according to the embodiment.

FIG. 11 shows a timing of the second tracing action. The fourth sequence 166 is subdivided into four steps in the embodiment which are numbered in an order. The channel controller 60 delivers the defined sequence number under way to the buffer 62B. The second tracing action includes (four) points of change at each defined sequence number as shown in FIG. 11. The defined sequence number and the channel interface signal are sampled at each point of change and stored in the RAM 102.

The comparison at Step 220 for the second tracing action is made between the channel interface signal and its expected value (a channel interface signal value in the normal communication shown in FIG. 7) for each defined sequence which is stored in a defined sequence number table 146 of FIG. 9 assigned to the logic circuit data saved in the defined sequence number table 144. The defined sequence number table 144 also holds, in addition to the data of logic circuits, address data (of the start location and the end location) of the expected value, which is assigned to the logic circuit data and stored in the defined sequence number table 146. The expected value for the corresponding channel interface signal is retrieved using its address data. In case that the two tagout signals or the SRV Out signal and the SUP Out signal are diverted from their expected values at the fourth of trace timing but the tagin signals are not diverted from their expected values as determined from the comparison at Step 220, it is judged negative and the procedure goes again to Step 224.

At Step 224, a trace logic circuit to be downloaded in the succeeding (or third cycle) action is selected. For the purpose, the CPU 50 picks up the data of the trace logic circuit from the defined sequence number table 144 which provides a higher tracing action by sampling at a dividing frequency shorter than that defined by the change of the defined sequence number.

When the trace logic circuit to be downloaded has been selected for the third tracing action, the procedure moves back to Step 203. Then, the procedure of Step 203 to Step 222 is repeated including downloading of the third trace logic circuit, reading the channel interface signal and the channel sequence number when an error occurs, and comparing the channel interface signal with its expected value. In the initial setting at Step 210, the channel controller 60 is set for delivering the defined sequence number.

Figure 12:
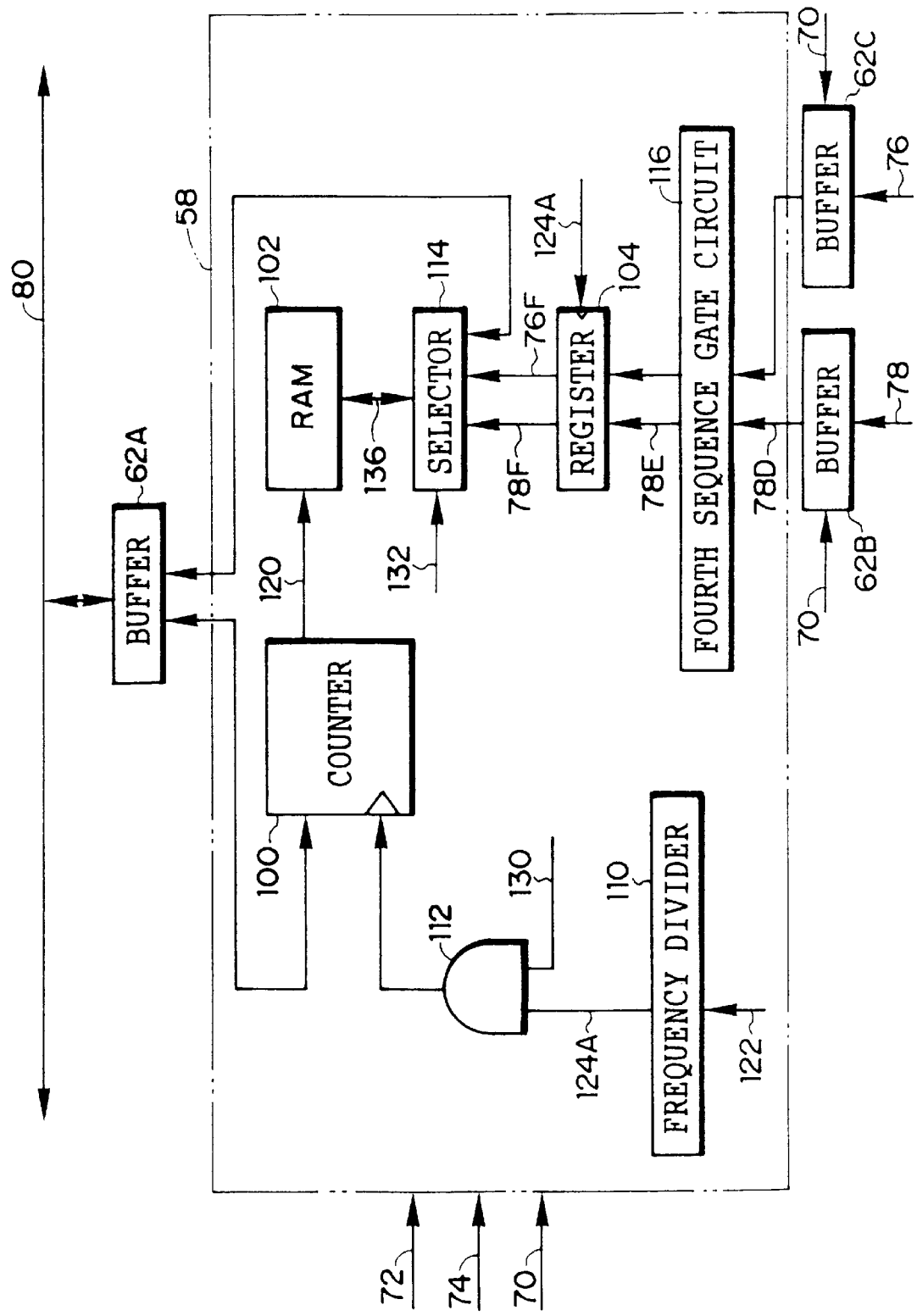
FIG. 12 is a block diagram of a trace logic circuit downloaded at the third from the FPGA of the embodiment and its peripherals connected.

FIG. 12 illustrates the third trace logic circuit downloaded to the FPGA 58 and its peripherals. As shown, the third trace logic circuit is distinguished from the second trace logic circuit shown in FIG. 10 by the fact that one register is connected between the fourth sequence gate circuit 116 and the selector 114 and there is no comparator. More specifically, the trace logic circuit used for the third tracing action is designed for not detecting any point of change in the channel sequence number but sampling the channel sequence number and the channel interface signal in the fourth sequence 166 in synchronization with the divider clock signal 124A from the frequency divider 110.

Figure 13:
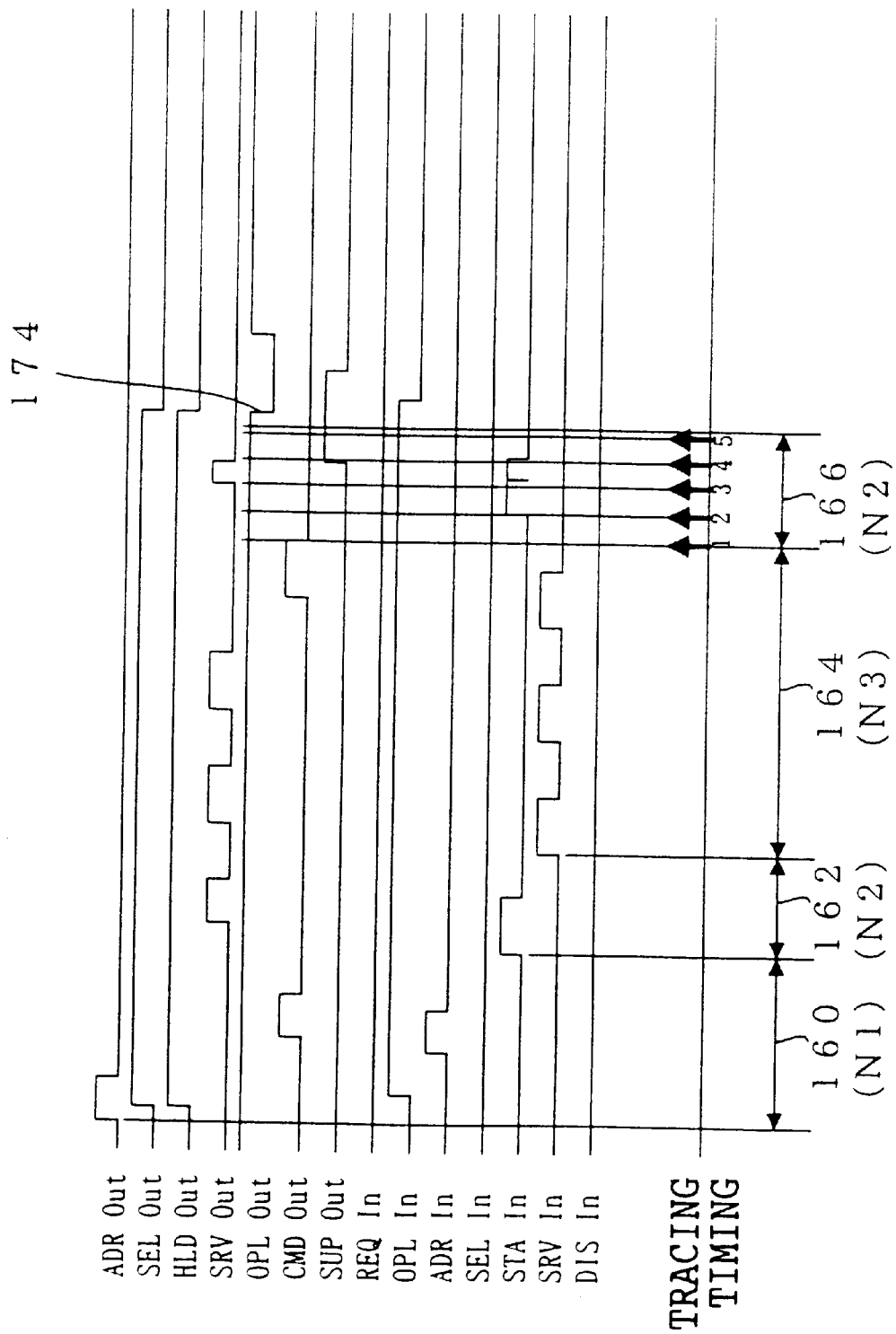
FIG. 13 is a timing chart showing the channel interface signals at an abnormal operation timed by the trace logic circuit shown in FIG. 12 according to the embodiment.

FIG. 13 shows a timing of the third tracing action. As shown, the defined sequence number and the channel interface signal in the fourth sequence 166 is sampled at intervals of a timing (five locations) synchronized with the divider clock signal 124A and stored in the RAM 102.

As the result of comparison between the channel interface signal and its expected value at Step 220 for the third tracing action, it is found that the two tagout signals or the SRV Out signal and the SUP Out signal are diverted from their expected values at the fourth and fifth sampling locations but the tagin signals are not diverted from their expected values. This appears negative and the procedure goes again to Step 224.

At Step 224, a trace logic circuit to be downloaded in the succeeding (or fourth cycle) action is selected. For the purpose, the CPU 50 picks up the data of the trace logic circuit from the defined sequence number table 144 which provides a higher tracing action than the trace logic circuit for the third tracing action shown in FIG. 12.

When the trace logic circuit to be downloaded has been selected for the fourth tracing action, the procedure moves back to Step 203. Then, the procedure of Step 203 to Step 222 is repeated including downloading of the fourth trace logic circuit, reading the channel interface signal and the channel sequence number when an error occurs, and comparing the channel interface signal with its expected value. In the initial setting at Step 210, the channel controller 60 is set for delivering the defined sequence number.

Figure 14:
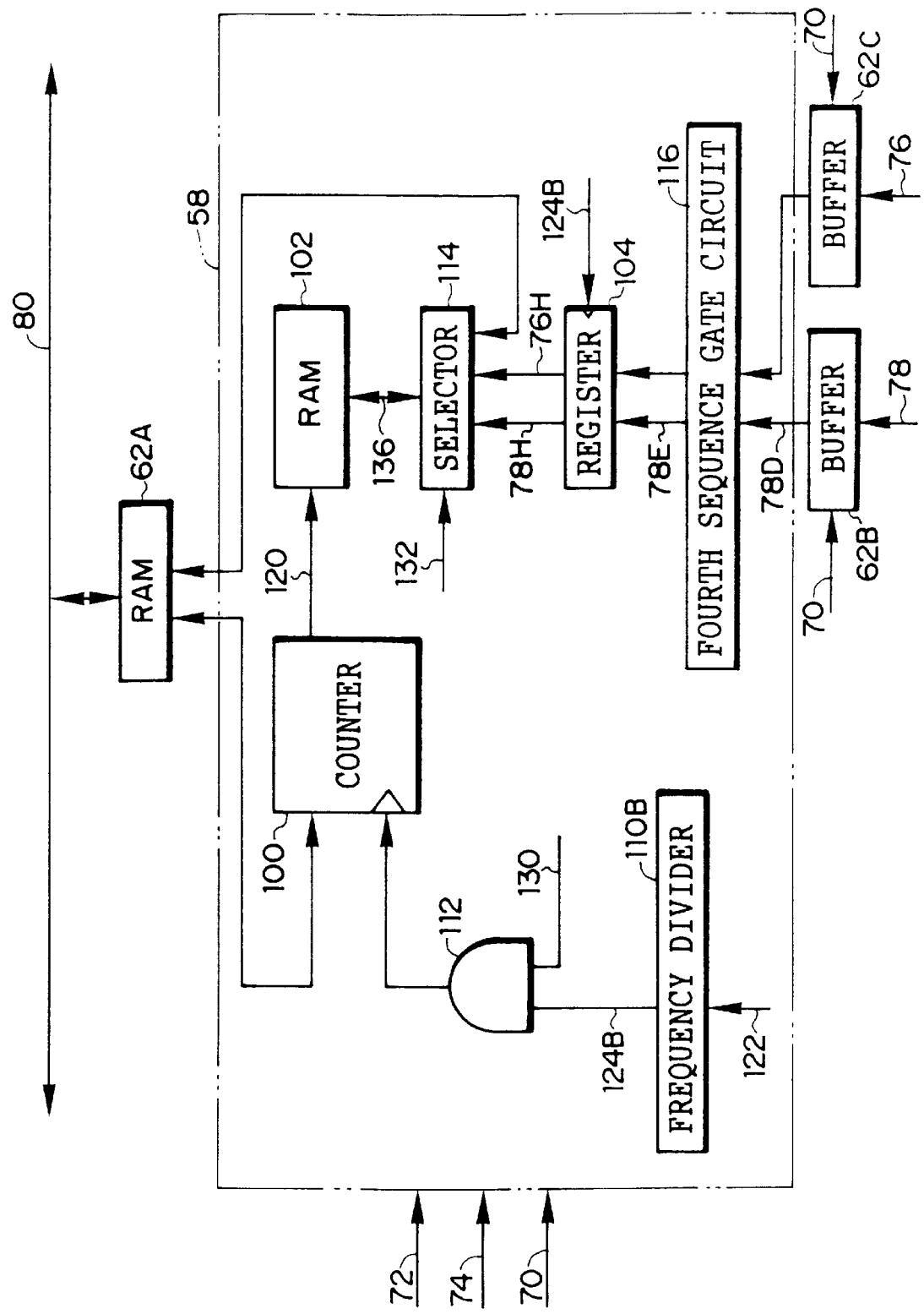
FIG. 14 is a block diagram of a trace logic circuit downloaded at the fourth from the FPGA of the embodiment and its peripherals connected.

FIG. 14 illustrates the fourth trace logic circuit downloaded to the FPGA 58 and its peripherals. As shown, the fourth trace logic circuit is distinguished from the third trace logic circuit shown in FIG. 12 by the fact that the dividing frequency of a frequency divider 110B is shorter than that of the frequency divider 110 of the trace logic circuit shown in FIG. 12. The trace logic circuit used for the fourth tracing action is designed for sampling the channel sequence number and the channel interface signal in the fourth sequence 166 in synchronization with a divider clock signal 124B from the frequency divider 110B of which dividing frequency is shorter than the third trace logic circuit.

Figure 15:
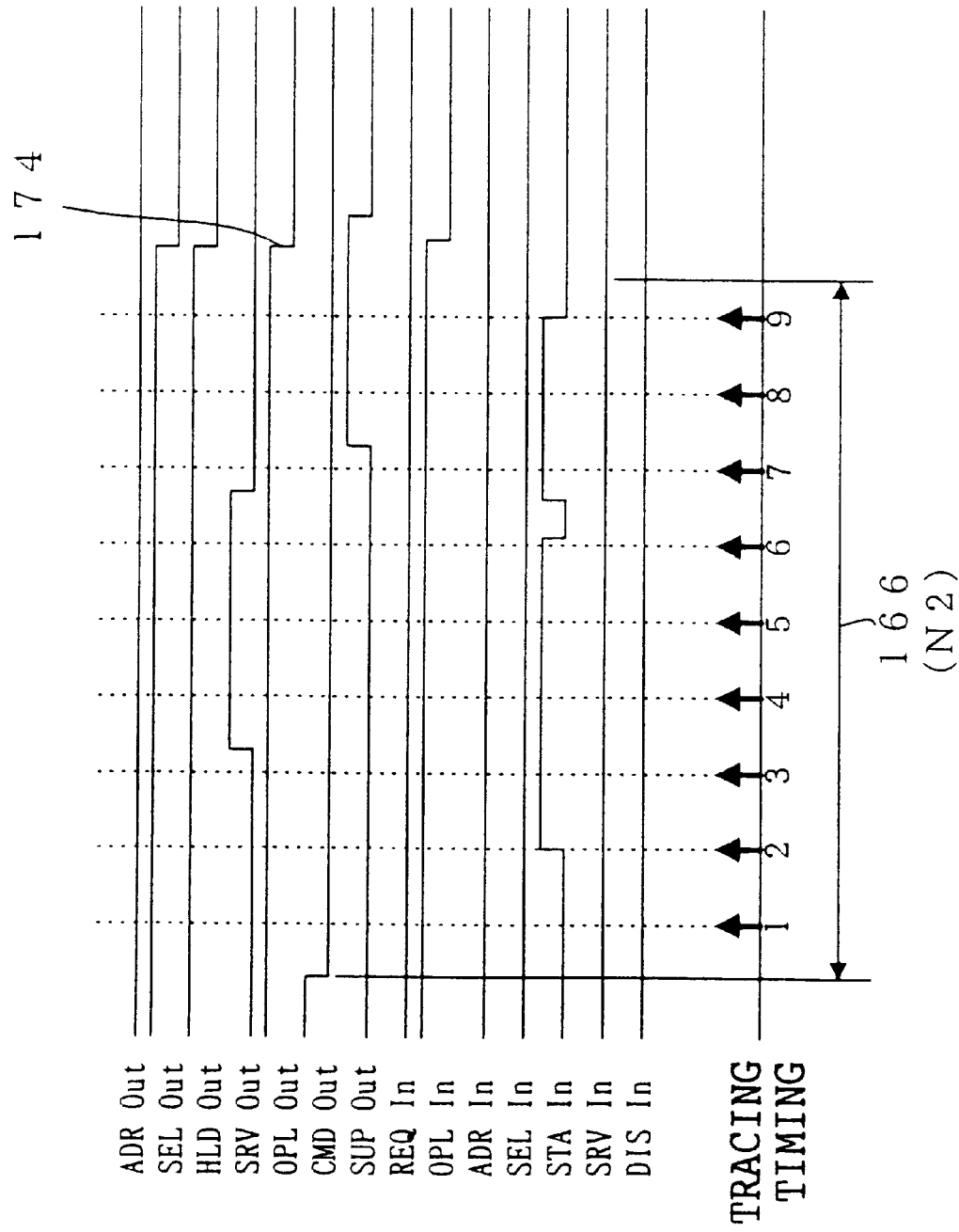
FIG. 15 is a timing chart showing the channel interface signals at an abnormal operation timed by the trace logic circuit shown in FIG. 14 according to the embodiment.

FIG. 15 shows a timing of the fourth tracing action. For clarification of the diagram, the fourth sequence 166 is enlarged. As shown, the defined sequence number and the channel interface signal in the fourth sequence 166 is sampled at intervals of a timing (nine locations) synchronized with the divider clock signal 124B of which dividing frequency is shorter than that of the divider clock signal 124A and stored in the RAM 102.

As the result of comparison between the channel interface signal and its expected value at Step 220 for the fourth tracing action, it is found that the tagout signal or SRV Out signal is diverted from its expected value at the seventh sampling location and also, both the SRV Out signal and the SUP Out signal are diverted from their expected values at the eighth and ninth sampling locations but the tagin signals are not diverted from their expected values. This appears negative and the procedure goes again to Step 224.

At Step 224, a trace logic circuit to be downloaded in the succeeding (or fifth cycle) action is selected. For the purpose, the CPU 50 picks up the data of the trace logic circuit from the defined sequence number table 144 which provides a higher tracing action by sampling at a dividing frequency shorter than that of the trace logic circuit used for the fourth tracing action.

When the trace logic circuit to be downloaded has been selected for the fifth tracing action, the procedure moves back to Step 203. Then, the procedure of Step 203 to Step 222 is repeated including downloading of the fifth trace logic circuit, reading the channel interface signal and the channel sequence number when an error occurs, and comparing the channel interface signal with its expected value. In the initial setting at Step 210, the channel controller 60 is set for delivering the defined sequence number.

Figure 16:
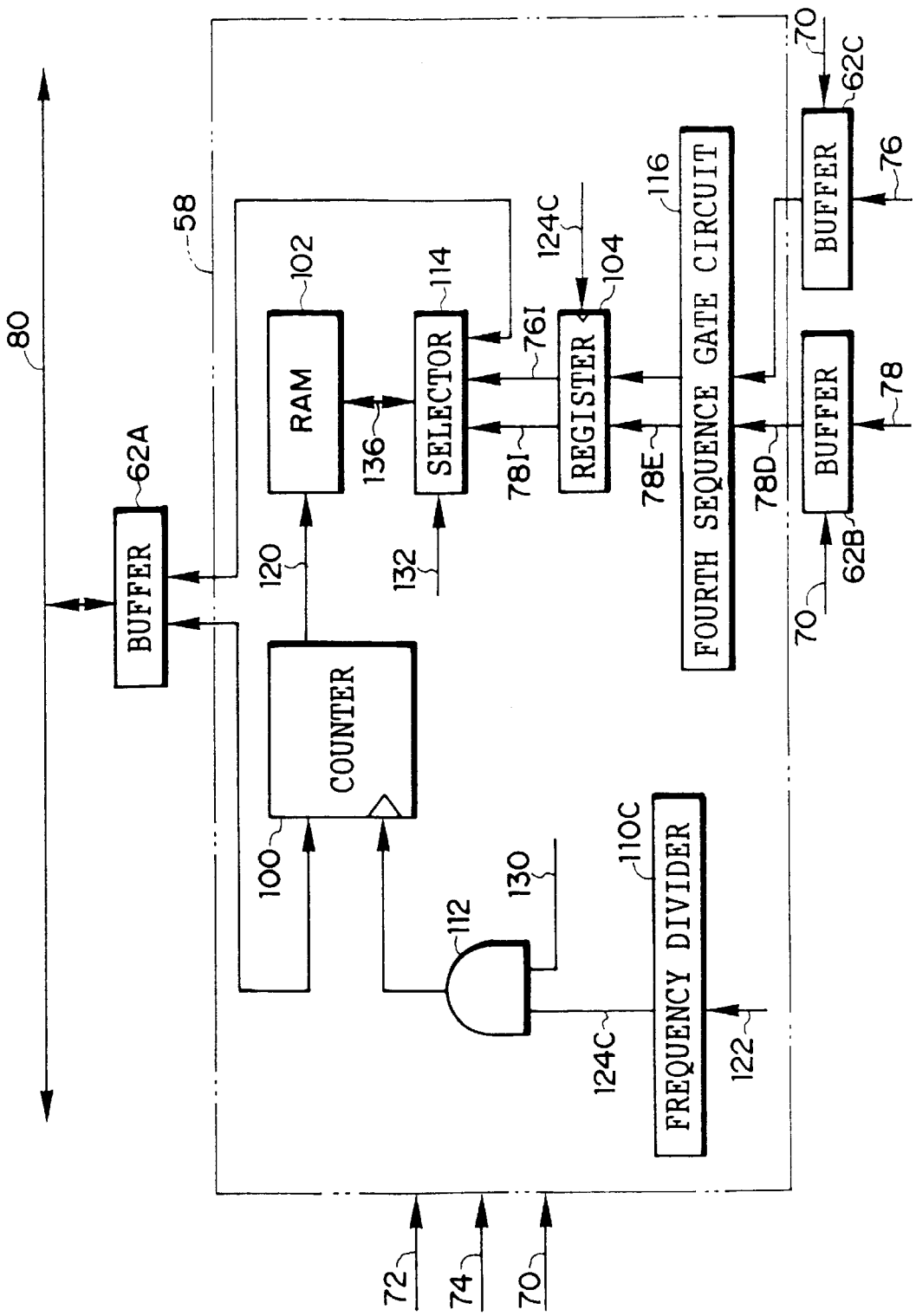
FIG. 16 is a block diagram of a trace logic circuit downloaded at the fifth from the FPGA of the embodiment and its peripherals connected.

FIG. 16 illustrates the fifth trace logic circuit downloaded to the FPGA 58 and its peripherals. As shown, the fifth trace logic circuit is distinguished from the fourth trace logic circuit shown in FIG. 14 by the fact that the dividing frequency of a frequency divider 110C is shorter than that of the frequency divider 110B of the trace logic circuit shown in FIG. 14. The trace logic circuit used for the fifth tracing action is designed for sampling the channel sequence number and the channel interface signal in the fourth sequence 166 in synchronization with a divider clock signal 124C from the frequency divider 110C of which dividing frequency is shorter than the fourth trace logic circuit.

Figure 17:
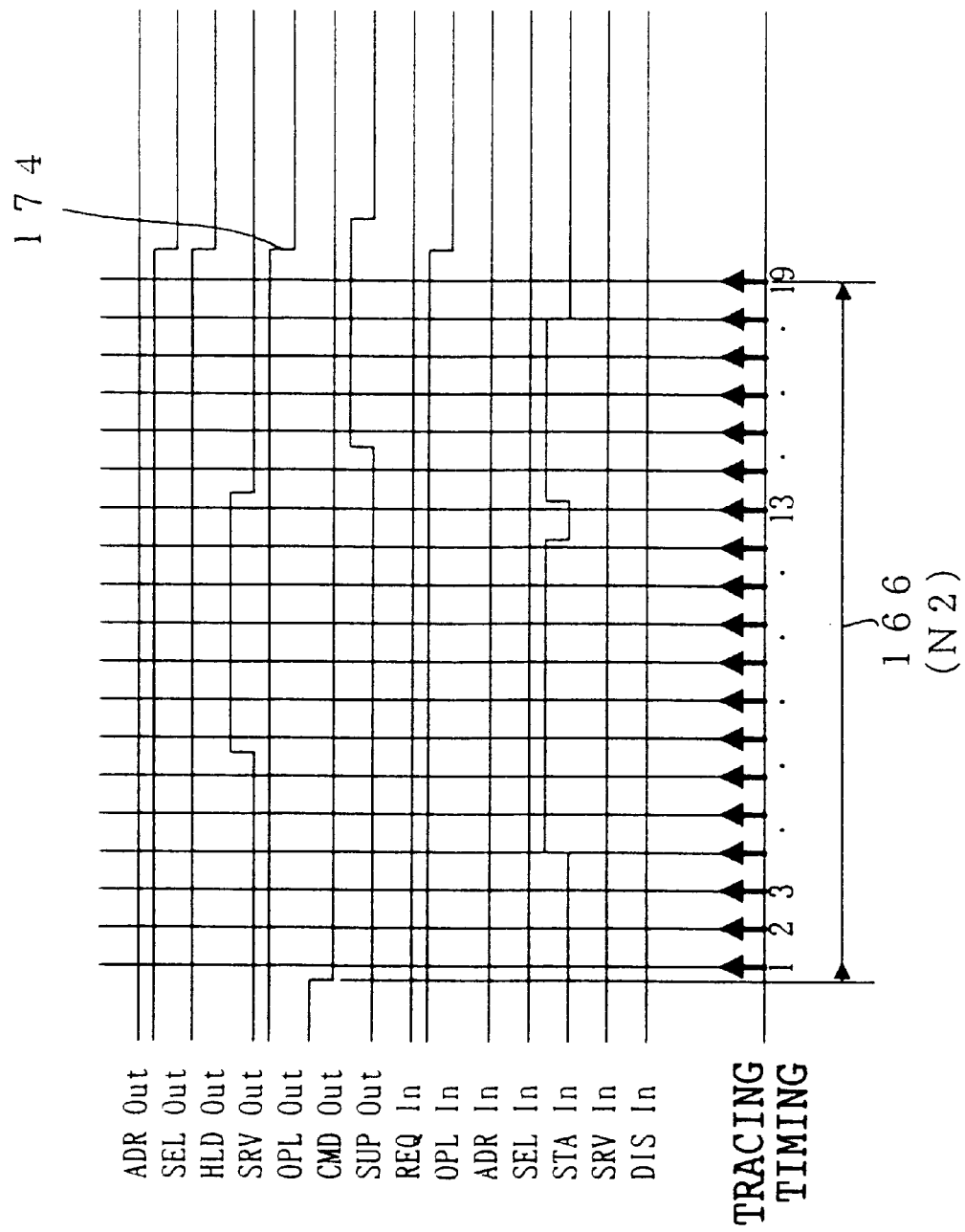
FIG. 17 is a timing chart showing the channel interface signals at an abnormal operation timed by the trace logic circuit shown in FIG. 16 according to the embodiment.

FIG. 17 shows a timing of the fifth tracing action. As shown, the defined sequence number and the channel interface signal in the fourth sequence 166 is sampled at intervals of a timing (nineteen locations) synchronized with the divider clock signal 124C of which dividing frequency is shorter than that of the divider clock signal for the fourth tracing action and stored in the RAM 102.

As the result of comparison between the channel interface signal and its expected value at Step 220 for the fifth tracing action, it is found that the two tagout signals or the SRV Out signal and the SUP Out signal are diverted from their expected values and the tagin signal or STA In signal is decayed and diverted from its expected value at the thirteenth sampling location. This implies that the STA In signal has a shoot in the fourth sequence 166 causing the host system 30 to deliver the selective reset signal 174. It is thus judged positive at Step 222 and the procedure moves to Step 226 for responding to the occurrence of an error or transmitting the error signal to the processor board 12. This is followed by terminating the control program.

As set forth above, the input/output controller apparatus of the first embodiment of the present invention employs the FPGA capable of repeating the generation of a logic circuit, whereby, if an error occurs in the communication, difference types of the logic circuits can be produced for identifying the cause of the error. Accordingly, its installation area will be minimized as compared with conventional assembly of different logic circuits.

Also, for identifying the cause of the error, the channel sequence number released sequentially from the channel controller is used in addition to the channel interface signal. This will reduce the duration of time required for identifying the cause of the error.

If the cause of the error fails to be identified, a different trace logic circuit is called for updating the channel interface signal and the channel sequence number. By repeating this action, the identification of the cause of the error will automatically be performed, thus consuming less amounts of energy.

The channel interface signal is roughly sampled at first for locating the error in one of undefined sequences and then, the undefined sequence of the channel interface signal is precisely sampled. This requires a smaller capacity of the RAM for storing the data of the channel interface signal as compared with precisely sampling all the sequences.

Moreover, the identification of the cause of the error is implemented by a relatively simple manner in which the channel interface signal is compared with its expected value predetermined and saved, thus requiring a shorter operating time.

The present invention is not limited to the first embodiment in which the data of different trace logic circuits and the expected value of each channel sequence number are stored in the form of database in the ROM 52. It may be possible that the processor board 12 is equipped with a storage device such as a hard disk which holds a database different from the database in the ROM 52 and, in case that the cause of an error is not identified by using the database in the ROM 52, the database in the storage device is downloaded to a specific area in the RAM 54 and used for locating the error. It also may be possible that the processor board 12 is connected with a communications network such as Ethernet and another database is downloaded from an external device such as a server linked to Ethernet and utilized for locating the error.

(Second Embodiment)

A second embodiment of the present invention will be described in the form of a combination of one single host I/F board and two or more different host systems.

In this embodiment, the processor board 12 shown in FIG. 1 is provided with a storage device, not shown, such as a hard disk. A control program shown in the flowchart of FIG. 18 and a group of tables shown in FIG. 19 are stored in the storage device and when needed, used by the processor board 12.

The entire system arrangement and the construction of the host I/F board in the second embodiment are substantially identical to those of the first embodiment and will be explained in no more detail.

Figure 19:
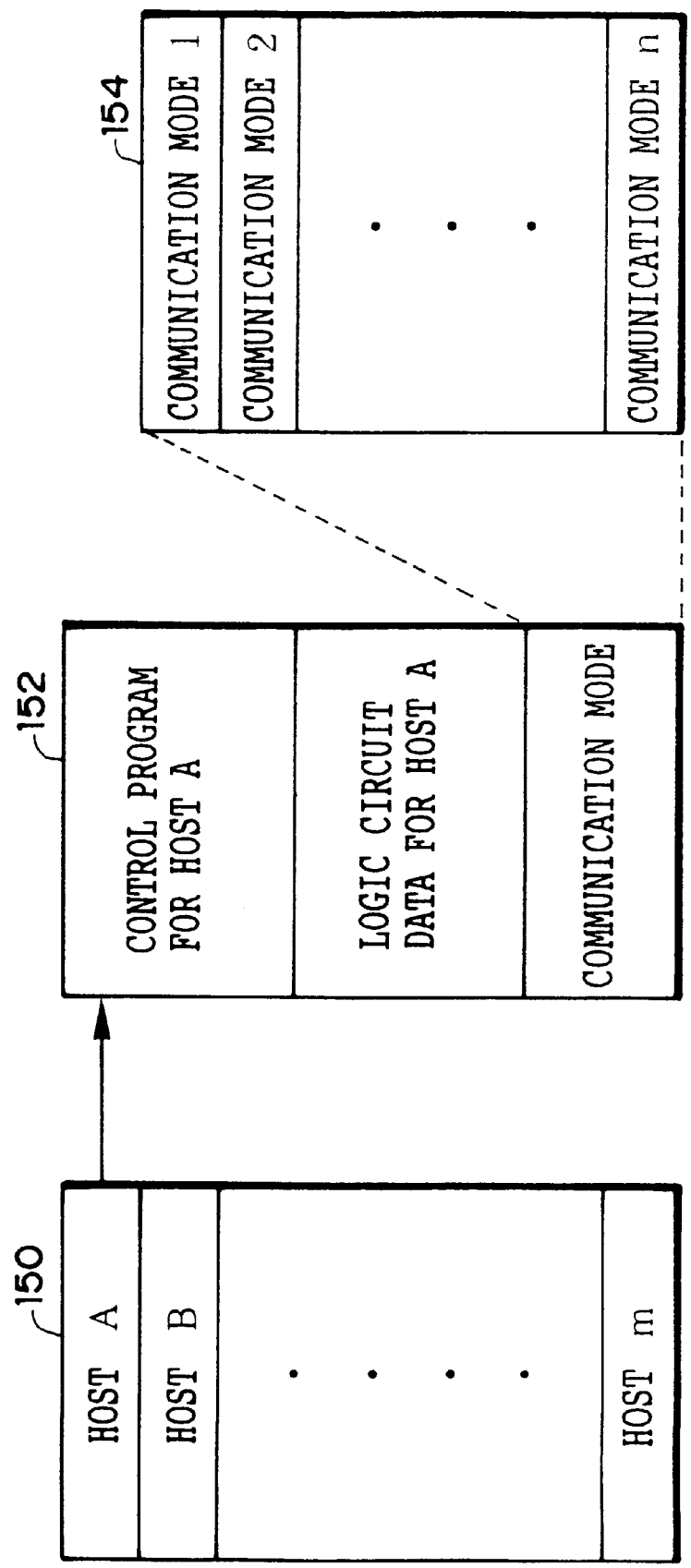
FIG. 19 is a schematic diagram showing a set of database stored in a storage device in the processor board of the second embodiment of the present invention.
Figure 20:
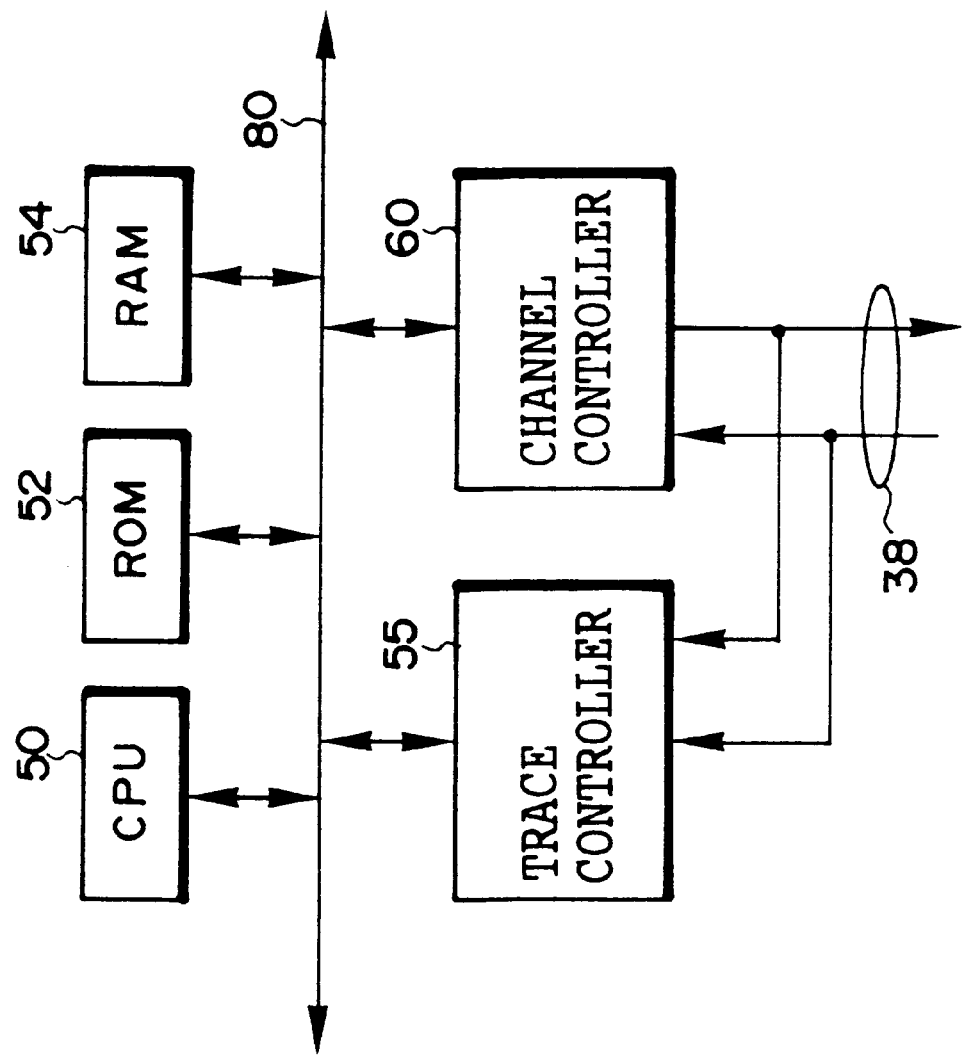
FIG. 20 is a schematic block diagram showing a conventional input/output controller apparatus.
Figure 21:
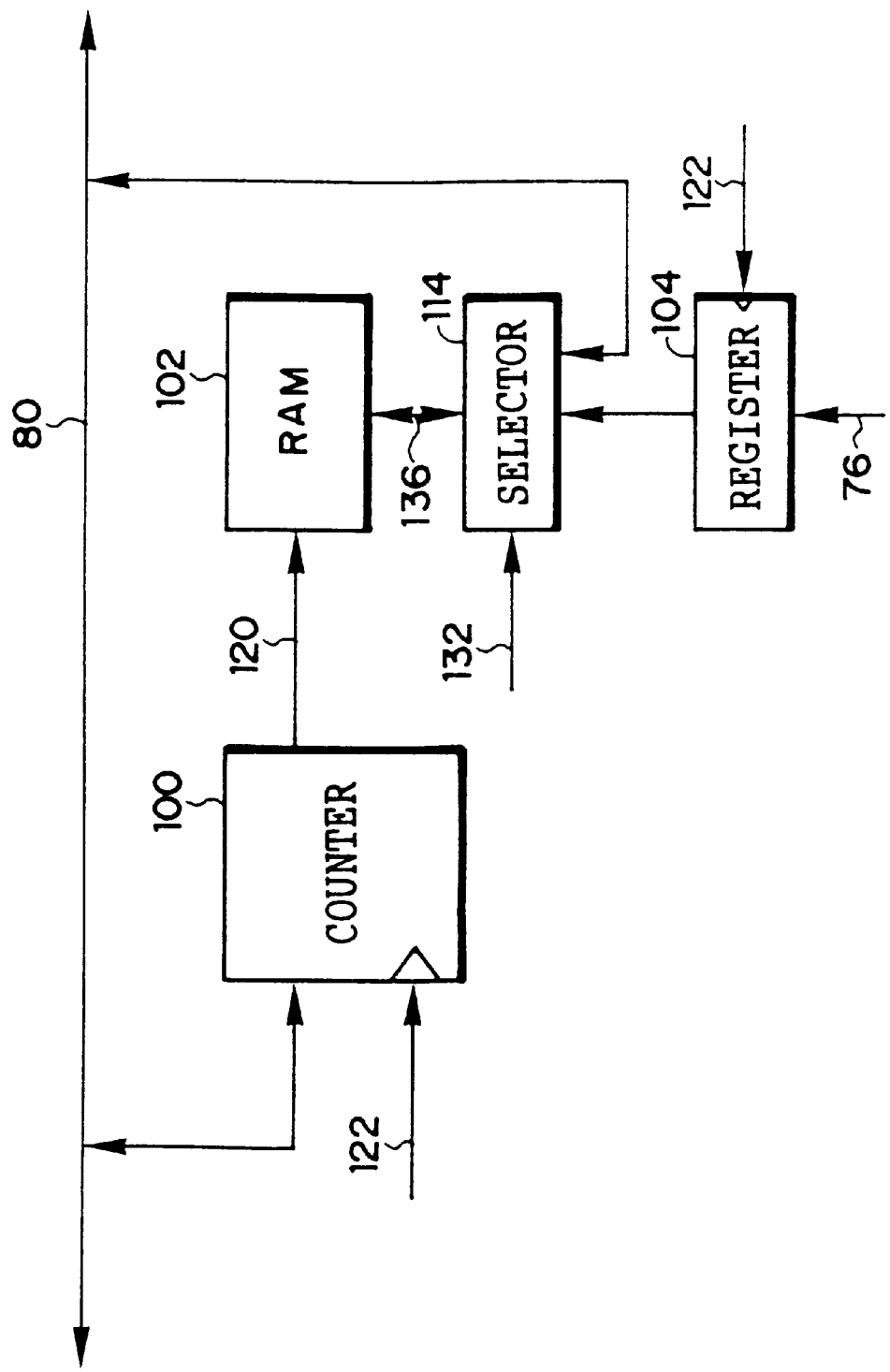
FIG. 21 is a schematic block diagram of a trace logic circuit used in the conventional apparatus.
Figure 22:
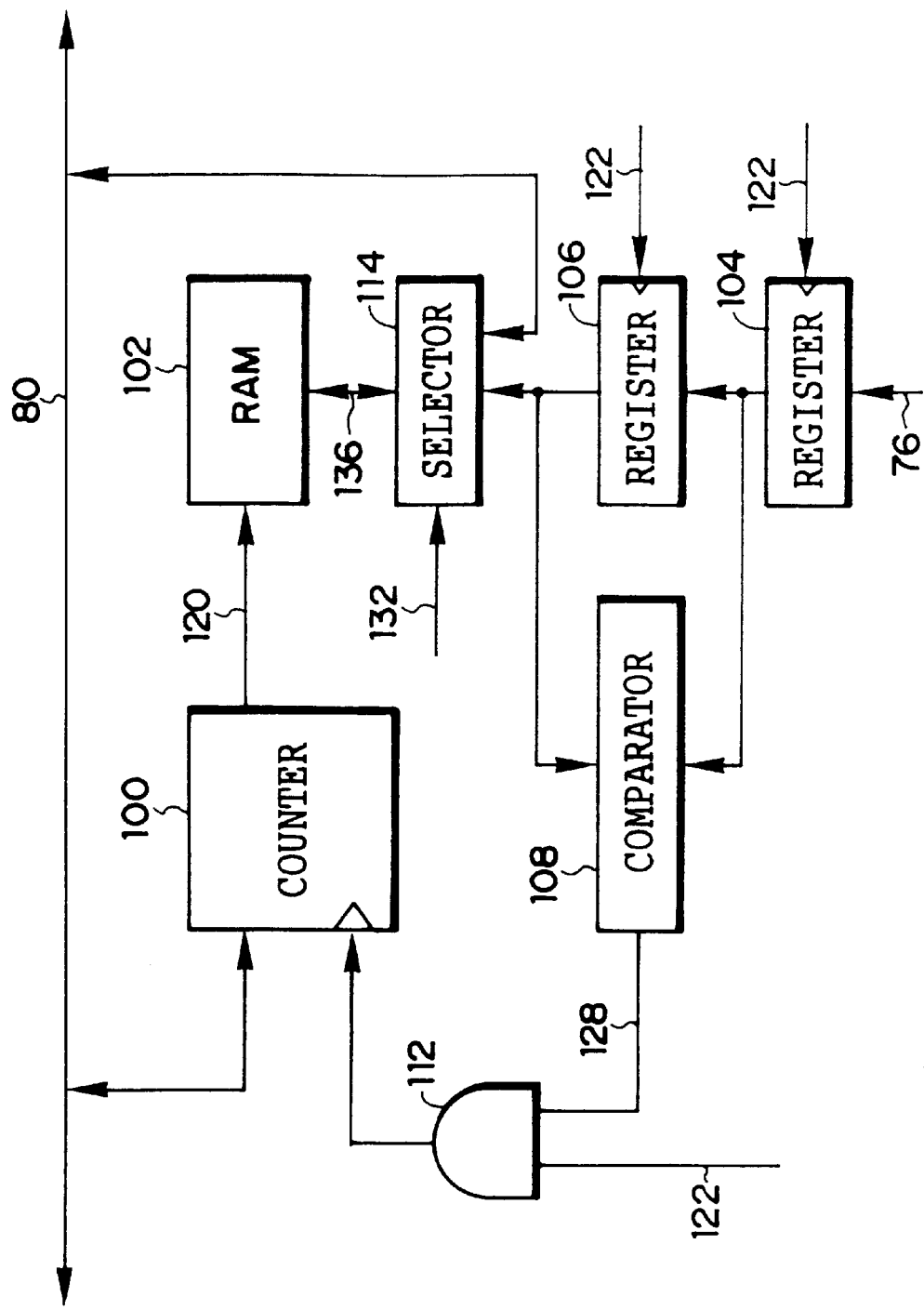
FIG. 22 is a schematic block diagram of another trace logic circuit used in the conventional apparatus.
Figure 23:
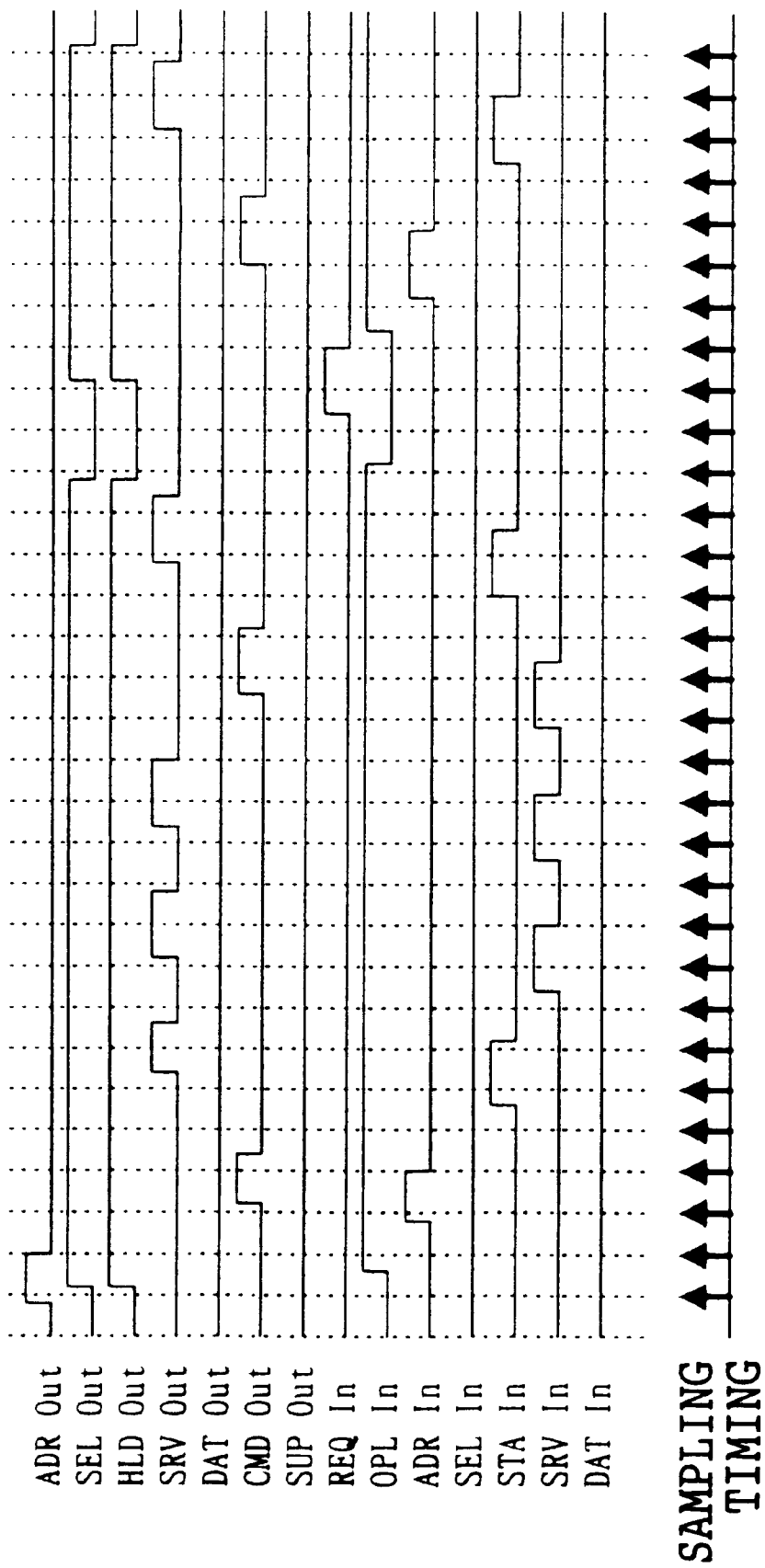
FIG. 23 is a timing chart showing sampling timed by the trace logic circuit shown in FIG. 21.
Figure 24:
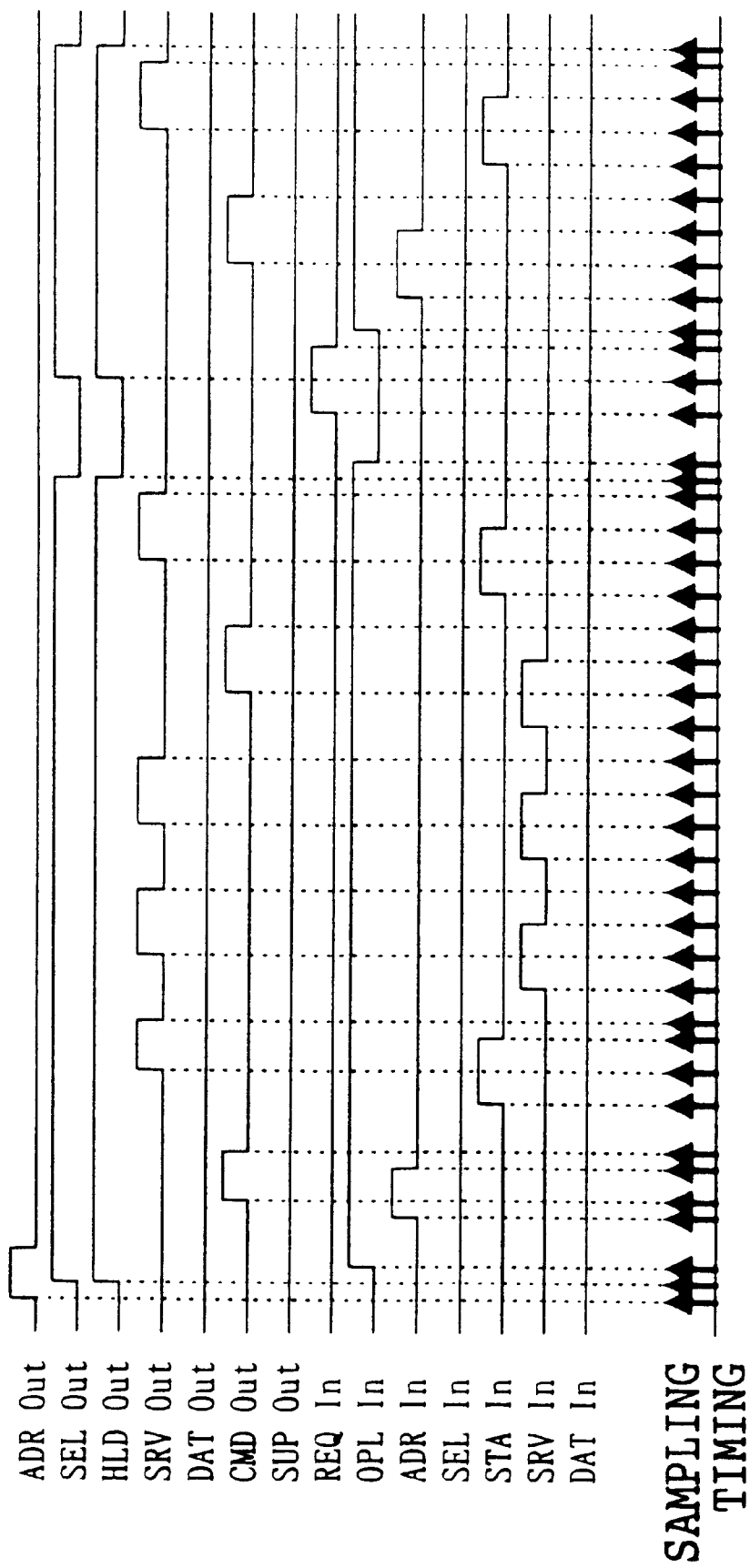
FIG. 24 is a timing chart showing sampling timed by the trace logic circuit shown in FIG. 22.

The description starts with the database shown in FIG. 19. A host table 150 has a number of storage area corresponding to the number (m in the second embodiment) of different host systems connected to the host I/F board 20. Each the area holds the start address and size of the host system in a separate host table 152.

The separate host table 152 holds control programs assigned to the host systems, a logic circuit data used for the first tracing action, and a number (n in this embodiment) of communication modes 154. The control programs stored in the separate host table 152 are similar to that shown in the flowchart of FIG. 3 and used by the CPU 50 of the host I/F board 20 in the first embodiment. The table for the communication modes 154 like the communication mode table 140 shown in FIG. 9 has a plurality of storage areas for storing data of the n communication modes. Each the area holds a start address of the undefined sequence number table assigned to the communication mode.

Also, lower level tables than the separate host table 152 are provided (as not shown) including an undefined sequence number table 142 and a defined sequence number table 144 which are lower than the communication mode table 140 shown in FIG. 9.

The operation of the second embodiment will now be described referring to FIG. 18.

At Step 230, an unshown controller in the printer 24 is subjected to initial checking. It is examined at Step 232 from the initial checking at Step 230 whether an error occurs or not. When any error is found, the procedure goes to Step 242 for taking an action to eliminate the error before the control program is terminated.

When no error is found at Step 232, the procedure advances to Step 234 for selecting the host system connected to the host I/F board 20. At the time, the processor board 12 displays a list of all the host systems assigned to the host I/F board 20 on a CRT display 26 and waits for an operator selecting a desired host system. The operator may select and enter through a keyboard 28 the desired host system from the list displayed on the CRT display 26.

As the selection of the desired host system connected to the host I/F board 20 has been completed, the separate host table 152 assigned to the desired host system selected at Step 234 along with the undefined sequence number table 142 and the defined sequence number table 144 which are lower than the communication mode table 140 shown in FIG. 9 are downloaded at Step 236 to corresponding areas in a RAM 54 of the host I/F board 20.

This is followed by Step 238 where it is examined whether an error occurs during the downloading at Step 236. When an error is found, the procedure goes to Step 242 for taking an action to eliminate the error before the control program is terminated. When no error is found, the procedure moves to Step 240 for directing the CPU 50 in the host I/F board 20 to start the control program of the separate host table 152 downloaded at Step 236 to the RAM 54 in the host I/F board 20. In the host I/F board 20, the control program and the tables downloaded at Step 236 are used for performing a series of actions similar to those of the control programmer of the first embodiment shown in the flowchart of FIG. 3.

The address of the logic circuit data to be released during the first tracing action at Step 204 of the flowchart shown in FIG. 3 is identical to that downloaded at Step 236 of the flowchart shown in FIG. 18 and stored in the separate host table 152.

As set forth above, the input/output controller apparatus of the second embodiment of the present invention allows a group of the tables assigned to the different host systems and shown in FIG. 19 to be preliminarily stored in an unshown storage device in the processor board 12 so that it can be connected to any desired one of the difference host systems.

The present invention is not limited to the prescribed embodiments where the channel interface signal retrieved from the trace logic circuit is used as data for detecting the cause of an error but may permit the channel interface signal to be transferred to the processor board 12 which serves as an upper level device. In this case, the processor board 12 is enabled to display an edited version of the channel interface signal on the CRT display 26 or print out it from the printer 24. It is also possible to provides the processor board 12 with a communications device for communication with remote terminals, thus allowing e.g. a service worker to access the channel interface signal through the remote terminal and the communication device.

What is claimed is:

1. An input/output controller apparatus connected between channels of a host system and peripherals for tracing channel interface signals, comprising:

a storage means for storing a plurality of logic circuit data, each logic circuit data producing a trace logic circuit of a proper type for collecting tracing data to identify an intrinsic fault;

a download controlling means responsive to an input of the type of a trace logic circuit for downloading the logic circuit data of the logic circuit of the type from said storage means;

a field programmable gate array responsive to downloading the logic circuit data from said storage means for generating a trace logic circuit corresponding to the logic circuit data;

a channel controlling means for controlling a sequence of input and output actions over said channels and producing an internal signal indicative of controlling said sequence of input and output actions; and a controlling means for delivering a type of the trace logic circuit to said download controlling means and, when a fault occurs during the tracing, reading the tracing data collected by the trace logic circuit produced and said internal signal produced by said channel controlling means to identify the cause of the fault and, when the cause of said fault is not identified, delivering another type of the trace logic circuit, which is to be downloaded successively, to said download controlling means, and reading the tracing data collected by a newly generated trace logic circuit and said internal signal produced by said channel controlling means to identify the cause of the fault.

2. An input/output controller apparatus according to claim 1, wherein said controlling means, when the cause of said fault is not identified, specifies a region which may include a location where said fault occurs from the tracing data collected by the type of said trace logic circuit and selects another type of the trace logic circuit which is capable of precisely collecting the tracing data in said region and which is to be downloaded successively.

3. An input/output controller apparatus according to claim 1, wherein said controlling means identifies the cause of said fault by examining whether or not said collected tracing data coincides with a reference data at a normal operation.

4. An input/output controller apparatus according to claim 2, wherein said controlling means identifies the cause of said fault by examining whether or not said collected tracing data coincides with a reference data at a normal operation.

5. An input/output controller apparatus according to claim 1, further comprising a second download controlling means for downloading a second logic circuit data, which is different from that stored in said storage means, from a memory in an upper level device and transmitting to a second storage means.

6. An input/output controller apparatus according to claim 2, further comprising a second download controlling means for downloading a second logic circuit data, which is different from that stored in said storage means, from a memory in an upper level device and transmitting to a second storage means.

7. An input/output controller apparatus according to claim 3, further comprising a second download controlling means for downloading a second logic circuit data, which is different from that stored in said storage means, from a memory in an upper level device and transmitting to a second storage means.

8. An input/output controller apparatus according to claim 4, further comprising a second download controlling means for downloading a second logic circuit data, which is different from that stored in said storage means, from a memory in an upper level device and transmitting to a second storage means.

9. An input/output controller apparatus according to claim 1, further comprising a transferring means for transferring said tracing data to said upper level device.

10. An input/output controller apparatus according to claim 2, further comprising a transferring means for transferring said tracing data to said upper level device.

11. An input/output controller apparatus according to claim 3, further comprising a transferring means for transferring said tracing data to said upper level device.

12. An input/output controller apparatus according to claim 4, further comprising a transferring means for transferring said tracing data to said upper level device.

13. An input/output controller apparatus according to claim 5, further comprising a transferring means for transferring said tracing data to said upper level device.

14. An input/output controller apparatus according to claim 6, further comprising a transferring means for transferring said tracing data to said upper level device.

15. An input/output controller apparatus according to claim 7, further comprising a transferring means for transferring said tracing data to said upper level device.

16. An input/output controller apparatus according to claim 8, further comprising a transferring means for transferring said tracing data to said upper level device.

17. An input/output controller apparatus according to claim 5, wherein said storage means is a ROM and said second storage means is a RAM.

18. An input/output controller apparatus according to claim 13, wherein said storage means is a ROM and said second storage means is a RAM.

* * * * *